United States Patent [19]

Muljadi

[11] Patent Number: 5,798,632
[45] Date of Patent: Aug. 25, 1998

[54] VARIABLE SPEED WIND TURBINE GENERATOR WITH ZERO-SEQUENCE FILTER

[75] Inventor: Eduard Muljadi, Golden, Colo.

[73] Assignee: Midwest Research Institute, Kansas City, Mo.

[21] Appl. No.: 870,858

[22] Filed: Jun. 6, 1997

Related U.S. Application Data

[63] Continuation of Ser. No. 503,818, Jul. 18, 1995, abandoned.

[51] Int. Cl.⁶ .................................................. H02P 9/00
[52] U.S. Cl. .................. 322/29; 322/20; 290/44; 290/55
[58] Field of Search ................... 322/29, 20, 28; 290/44, 55

[56] References Cited

U.S. PATENT DOCUMENTS

| | | | |
|---|---|---|---|
| 4,087,698 | 5/1978 | Myers | 307/84 |
| 4,189,648 | 2/1980 | Harner | 290/44 |
| 4,218,732 | 8/1980 | Lafuze | 363/160 |
| 4,228,361 | 10/1980 | Jacobs et al. | 290/44 |
| 4,357,542 | 11/1982 | Kirschbaum | 290/44 |
| 4,695,736 | 9/1987 | Doman et al. | 290/44 |
| 4,794,316 | 12/1988 | Uchino et al. | 322/47 |
| 4,906,060 | 3/1990 | Claude | 322/29 |
| 4,992,920 | 2/1991 | Davis | 363/36 |
| 5,083,039 | 1/1992 | Richardson et al. | 290/44 |
| 5,155,375 | 10/1992 | Holley | 290/44 |
| 5,187,427 | 2/1993 | Erdman | 323/207 |
| 5,225,712 | 7/1993 | Erdman | 290/44 |
| 5,289,041 | 2/1994 | Holley | 290/44 |
| 5,652,485 | 7/1997 | Spiegel et al. | 318/147 |

*Primary Examiner*—Steven L. Stephan
*Assistant Examiner*—Nicholas Ponomarenko
*Attorney, Agent, or Firm*—Ken Richardson

[57] ABSTRACT

A variable speed wind turbine generator system to convert mechanical power into electrical power or energy and to recover the electrical power or energy in the form of three phase alternating current and return the power or energy to a utility or other load with single phase sinusoidal waveform at sixty (60) hertz and unity power factor includes an excitation controller for generating three phase commanded current, a generator, and a zero sequence filter. Each commanded current signal includes two components: a positive sequence variable frequency current signal to provide the balanced three phase excitation currents required in the stator windings of the generator to generate the rotating magnetic field needed to recover an optimum level of real power from the generator; and a zero frequency sixty (60) hertz current signal to allow the real power generated by the generator to be supplied to the utility. The positive sequence current signals are balanced three phase signals and are prevented from entering the utility by the zero sequence filter. The zero sequence current signals have zero phase displacement from each other and are prevented from entering the generator by the star connected stator windings. The zero sequence filter allows the zero sequence current signals to pass through to deliver power to the utility.

32 Claims, 14 Drawing Sheets

5,798,632

1
VARIABLE SPEED WIND TURBINE GENERATOR WITH ZERO-SEQUENCE FILTER

This application is a continuation of application Ser. No. 08/503,818, filed Jul. 18, 1995, now abandoned.

The United States Government has rights in this invention under Contract No. DE-AC 36-83CH10093 between the U.S. Department of Energy and the National Renewable Energy Laboratory, a Division of Midwest Research Institute.

BACKGROUND OF THE INVENTION

1. Field of the Invention

This invention relates generally to a generator system for converting wind power into electrical power to be delivered to a public utility and, more particularly, to a variable speed wind turbine generator system in which electrical power in the form of three phase alternating current is converted and delivered to a utility with a single phase, sinusoidal waveform at sixty (60) hertz and unity power factor.

2. Description of the Prior Art

Wind power has been used for ages to pump water, grind grain, and more recently to generate electricity. Such historic uses of wind power, however, have been primarily in applications where a single wind machine operated alone for the benefit of one or a small number of users. There is now more interest in developing wind power generator systems in which electricity produced by a single wind power generator can be supplied to utility power grids. However, when the electrical power generated by a wind power system is to be supplied to a utility grid, then the supplied power is required to have a constant frequency, e.g., sixty (60) hertz, that is synchronized to and in phase with the frequency of the utility lines. The entire electrical infrastructure of the United States and most industrial, commercial, and even home electrical equipment is designed on the sixty (60) cycles-per-second (hertz) frequency standard, so any electric power supplied by utility company power grids in the United States has to conform to that standard. Other countries or regions have different frequency standards, for example, fifty (50) hertz in many European countries. The different frequency standards of different countries are not significant to this invention, but the difficulties of generating and supplying electric power efficiently from wind to a specific frequency standard without implementing mechanisms and techniques that compromise power generation efficiency in order to deliver at a specific frequency has been an ongoing problem.

Conversion of wind power into electrical power is accomplished in most wind power systems by connecting a wind-driven turbine to the shaft of an electric generator, usually an alternating current AC induction generator. Obtaining the required sixty (60) hertz or other standard frequency has in the past been accomplished by limiting the generator to a constant rotational speed, which, unless a variable speed transmission is used in the generator, requires that the wind turbine also rotate at a constant speed, regardless of the wind velocity. Requiring the constant speed operation of a wind turbine in variable wind velocity conditions, however, limits its energy conversion efficiency, thus also limiting the electric power generated by the system for delivery to the utility. The rotational speed of the rotating wind turbine needs to be variable and proportional to the wind velocity in order to obtain maximum power output from the generator.

Variable speed wind turbine generators in which the turbine rotational speed can vary according to varying ambient wind velocity conditions are, of course, an obvious solution, provided they can be made to produce constant sixty (60) hertz or other standard frequency AC electricity. The output power from a variable speed wind turbine generator depends largely on the velocity of the wind, the revolutions-per-minute (RPM) of the rotating turbine and the rotating rotor in the generator, and the frequency of the current signals flowing in the stator windings of the generator. Since the wind turbine shaft rotates the electric generator shaft and the rotor and the revolutions-per-minute (RPM) of the rotating wind turbine is directly proportional to the ambient wind velocity, for a specific ambient wind velocity, there is a specific RPM of the rotating turbine and rotating rotor. For a specific RPM of the rotating turbine and the rotating rotor, there is a specific frequency in hertz of the electric currents flowing in the stator windings of the generator that maximizes the generated power. Therefore, while a variable speed wind turbine system operating in varying wind velocity conditions can generate more electric power than a constant speed turbine generator, it requires a more complicated electrical system, since the generated electricity will have a variable frequency that needs to be converted to sixty (60) hertz before the electric power is delivered to a utility. Some prior art variable speed wind turbine generator systems use power switches to covert the frequency of the generated power to sixty (60) hertz or other standard frequency. For example, U.S. Pat. No. 5,083,039 issued to Richardson et al. discloses such a system that uses twelve switches. It is desirable, however, to reduce the number of power switches and the supporting electronic circuitry so as to reduce the complexity and cost of the generator system, to reduce the physical size of the wind generator system, and to increase the reliability and useful life of the generator system. In addition, it is desirable to have a generator system that adjusts the frequency of the currents supplied to the stator windings of the generator so as to optimize the power generated. Finally, the generator system should supply the generated power to the utility at unity power factor and with a sixty (60) hertz or other standard frequency in a sinusoidal waveform that is synchronized with the phase of the signals in the utility so as to maximize the power delivered to the utility by the generator. Unity power factor for purposes of this invention is defined as a power factor of one (1), which is obtained when the current and the voltage signals in a circuit are completely in phase.

SUMMARY OF THE INVENTION

Accordingly, it is a general object of this invention to provide a variable speed turbine generator system that generates an optimum level of power during varying wind velocity conditions and delivers the generated power to a utility at unity power factor and with a sixty (60) hertz or other standard frequency in a sinusoidal waveform that is synchronized with the phase of the signals in the utility.

It is another general object of this invention to provide a variable speed wind turbine generator system that minimizes the number of power switches and the complexity of the supporting electronic circuitry required to create the necessary current signals to excite the stator windings in the generator and the necessary current signals to deliver the generated power to the utility.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims.

To achieve the foregoing and other objects and in accordance with the purposes of the present invention, as embodied and broadly described therein, the apparatus of the present invention includes a variable speed wind turbine generator having its stator windings connected in a star configuration, an excitation controller that generates three current signals, each current signal having two current components, the first current component being the current signal necessary to supply three-phase balanced current signals to the stator windings in the generator and the second current component being the current signal necessary to deliver the real electric power generated by the generator to a utility at single-phase, unity power factor, and at sixty (60) hertz, and a zero sequence filter or bandpass filter to allow the second current component to be delivered to the utility while preventing the first current component from being delivered to the utility. The first current component signals supplied by the excitation controller and supplied to the stator windings in the generator have a frequency that is continuously adjusted by the excitation controller so that an optimum amount of power is continuously generated by the generator during varying wind velocity conditions. The second signal components supplied by the excitation controller and delivered to the zero sequence filter or bandpass filter are in phase with the signals in the utility and have a magnitude that is continuously adjusted by the excitation controller so that all of the real power generated by the generator is delivered to the utility.

The excitation controller includes an energy storage device that is charged when the power generator system is activated. The excitation controller further includes power switches, which can be comprised of transistors and diodes, that are individually and selectively activated and deactivated by pulsed voltage signals to create the desired current signals. The frequency of the activation and the deactivation of the power switches can be optionally controlled to increase the useful life of the power switches. The current signals produced by the power switches continuously depletes the energy stored in the energy storage device. However, the generated power continuously recharges the energy in the energy storage system so that the average energy in the energy storage remains constant. A feedback loop is used to ensure that the first current component signals are three-phase, balanced, and have the frequency required to maximize the generated power for the particular wind velocity. Feedback loops are also used to ensure that the second current component signals have the magnitude necessary to deliver all of the generated power to the utility, to ensure that there is no excess build up of energy in the energy storage device, and to ensure that the frequency of the second current component signals are all in phase with the signals in the utility The excitation controller also includes a voltage signal generator that creates specific voltage reference signals based on the wind velocity, the phase of the signals in the utility, and the amount of generated power that is delivered to the utility. The voltage reference signals created by the voltage signal generator are compared to second voltage signals that are representative of the current signals being produced by the excitation controller. The resultant voltage signal is used as a template to create the pulsed voltage signals that control the activation and the deactivation of the power switches.

BRIEF DESCRIPTION OF THE DRAWINGS

The accompanying drawings, which are incorporated in and form a part of the specifications, illustrate the preferred embodiments of the present invention, and together with the descriptions serve to explain the principles of the invention.

In the Drawings.

DETAILED DESCRIPTION OF THE PREFERRED EMBODIMENTS

Figure 1:
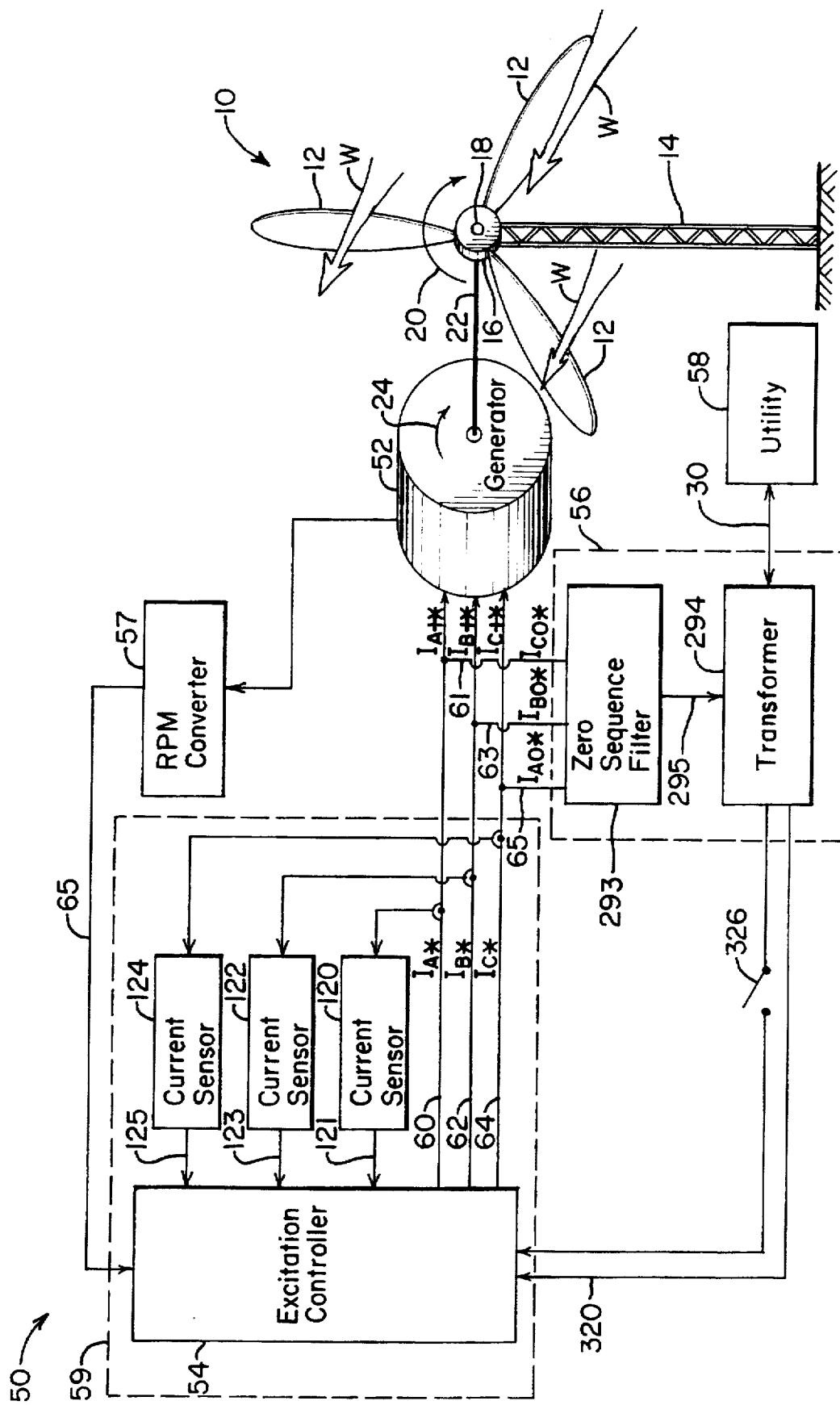
FIG. 1 shows a functional block diagram of the operative components and electronic circuitry of the generator system according to the present invention.

The generator system 50 of this invention, as illustrated in the function block diagram of FIG. 1, includes a wind turbine AC generator 52 for converting wind power to electric power. Essentially a wind turbine 10, usually comprising two or more large blades 12 mounted on a tower 14 to catch the prevailing winds W, is used to drive the generator 52 to produce electricity. The wind turbine blades 12 extend radially outward from a hub 16, which is mounted on a rotatable drive shaft 18. The wind W causes the blades 12 to rotate as indicated by arrow 20 on the drive shaft 18. The rotating drive shaft 18, connected by a mechanical linkage 22, to the linkage 22, to the generator 52, rotates the rotor in the generator 52, as indicated by the arrow 24, which causes the generator 52 to produce electric power from the power of the wind W acting on the blades 12. The electric power produced by the generator 52 is delivered to the utility company 58, which sells the electricity to its customers.

In this invention, the generator 52 is allowed to rotate 24 at speeds that vary with the velocity of the wind W, which allows more efficient and optimum production of electric power from whatever wind W happens to be blowing at any particular time. Generally, the higher the wind W velocity, the faster the turbine 10 rotates, thus the faster the rotor in the generator 52 can rotate 24. However, since the frequency of the alternating current (AC) produced by the generator 52 is related to how fast the rotor in the generator 52 rotates, the electric power produced by the generator 52 on its output wires 60, 62, 64 have to be conditioned and changed or converted by the system 50 of this invention so that only sixty (60) hertz or other standard frequency electric power is delivered on line 30 to the utility 58.

The purpose of this invention is to enable efficient production of electric power from ambient wind conditions and to deliver the power to a utility power grid at whatever standard frequency is used in the grid. In the United States, the standard frequency is sixty (60) hertz. Other countries or regions have adopted and use different standard frequencies, for example, fifty (50) hertz in many European countries. This invention is equally applicable to any frequency. For purposes of simplicity, this specification will refer to the sixty (60) hertz standard used in the United States and a number of other countries. However, such reference to sixty (60) hertz herein is exemplary only and is not intended to limit the structure, method, or use of the invention in any way. Therefore, other frequencies are considered to be equivalents of sixty (60) hertz for purposes of this invention.

The principal components used in the generator system 50 according to this invention for conditioning the electric power produced by the variable speed generator 52 to produce constant sixty (60) hertz power to the utility 58 includes the excitation controller 54, the RPM converter 57, the zero sequence filter 293, and the transformer 294. A principle feature of this invention is that both the electrical input signals or currents required to excite the stator windings (not shown in FIG. 1) in the generator 52, which produce the magnetic fields necessary for the generation of electricity, and to deliver the electric power produced by the generator 52 to the utility company 58, are fed simultaneously to the generator 52 and to the utility company 58 via the three wires on the leads 60, 62, 64. In other words, the winding signals or currents needed for the generator 52 and the signals or currents needed to deliver the generated electric power to the utility company 58 are both on the leads 60, 62, 64 at the same time. However, both the winding signals and the electric power delivery signals on the leads 60, 62, 64 have different frequency and phase characteristics, so they can be separated and used for their respective different purposes. A zero sequence filter 293 connected to the leads 60, 62, 64 via the power taps and leads 61, 63, 65, respectively, utilizes the different frequency and phase characteristics to effectively pass or transmit the generated electric power to the utility company 58, while effectively blocking the winding excitation signals on the leads 60, 62, 64 from passing to the utility company 58. Therefore, electric power on the leads 60, 62, 64 is conducted via the power taps and leads 61, 63, 65 to the utility company 58, while the excitation signals on the leads 60, 62, 64 are conducted to the windings (not shown in FIG. 1) in the generator 52, where they produce the magnetic fields necessary for the generator 52 to produce electric power. These components and functions will be described in more detail below.

Another principle feature of this invention is the excitation controller 54, which both produces the winding signals on the leads 60, 62, 64 for simultaneously creating the needed magnetic fields in the generator 52 and conditions the electric power on the leads 60, 62, 64. As mentioned above, the winding signals have different frequency and phase characteristics than the electric power, so even though they are carried on the same leads 60, 62, 64, they can be routed to different components to perform different functions. The electric power must have a frequency of sixty (60) hertz to match the conventional electric power standard for the United States or a frequency of fifty (50) hertz for Europe. The excitation controller 54 is designed, as will be described in more detail below, to provide the required sixty (60) hertz frequency transmitted by the zero sequence filter 293 to the utility company 58, regardless of the speed of the wind W or the resulting angular velocity (rotational speed) of the generator 52. At the same time, the excitation controller also provides the winding signals or currents at the appropriate frequencies and phases to produce the magnetic fields in the generator 52 that result in optimal electric power generation for the particular angular velocity 24 the generator 52 happens to be rotating at due to the wind W velocity at any point in time. An RPM converter 57 is used to monitor the actual angular velocity (rotational speed) of the rotor in the generator 52 and to feed signals indicative of that information via the lead 65 to the excitation controller 54. The excitation controller 54 uses the angular velocity information from the RPM converter 57 to configure and set the frequency of the stator signals or currents produced on the leads 60, 62, 64 for optimum power generation, as described above.

The electric power connection from the zero sequence filter 293 is preferably made by a transformer 294 to electrically isolate the system 50 from the utility company 58. The transformer 294 is connected to the zero sequence filter 293 by the lead 295 and to the utility company 58 by the lead 30.

For purposes of this description, it is helpful to label the three phase balanced positive sequence current signals supplied by the excitation controller 54 on the leads 60, 62, 64 to the stator windings of the generator 52 as $I_{A+*}$, $I_{B+*}$, $I_{C+*}$ respectively. The single phase current signals on the leads 60, 62, 64 required to deliver the generated power to the output filter 56 are labeled $I_{A0*}$, $I_{B0*}$, $I_{C0*}$ respectively. The excitation controller 54 uses the current sensors 120, 122, 124 in a feedback loop 59 to control the amount of the current and the waveform of the respective current signals $I_{A+*}$, $I_{B+*}$, $I_{C+*}$ and $I_{A0*}$, $I_{B0*}$, $I_{C0*}$ produced on the leads 60, 62, 64 to get maximum power production from the generator 52 and to deliver the power in a sixty (60) hertz sinusoidal waveform having approximately unity power factor to the utility company 58.

The generator 52 is a variable speed generator, thus the output power from the generator 52 depends in part on the velocity of the wind W, the rotational speed of the rotating rotor in the generator 52, and the frequency $f_+$ of the positive sequence current signals $I_{A+*}$, $I_{B+*}$, $I_{C+*}$ flowing in the stator windings of the wind generator 52. The angular velocity or RPM of the rotor in the generator 52 is related to the velocity of the wind W and the power load on the generator 52. Generally, where there is a constant power load on the generator 52, thus fairly constant resistance to rotation of the rotor in the generator 52, the angular velocity of the wind turbine 10 and the generator 52 will vary in direct proportion to the velocity of the wind W. The frequency $f_+$ of the positive sequence current signals $I_{A+*}$, $I_{B+*}$, $I_{C+*}$ flowing in the stator windings of the generator 52 can be changed according to a specific relationship to the changing angular velocity of the wind turbine 10 and the generator 52 so that the output power of the generator 52 is maximized for a particular wind W velocity. The leads 60, 62, 64 are connected to the stator windings in the generator 52, which is represented by the impedances 272, 274, 276, respectively (see FIG. 9). The impedances 272, 274, 276 are primarily inductive and can be, for example, $2.706 \times 10^{-4}$ henries, but they may also include a small resistance of, for example, 0.0085 ohms. The use of a variable speed generator to produce electric power and an RPM converter to measure the revolutions-per-minute (RPM) of the rotor in the generator 52 are well-known to people having ordinary skill in the art and need not be described in any further detail.

As mentioned above, a significant feature of this invention includes the excitation controller 54, which provides the current signals $I_{A*}$, $I_{B*}$, $I_{C*}$ necessary to excite the stator windings in the generator 52 and to deliver the real electric power generated by the generator 52 to the utility 58. The output current signals $I_{A*}$, $I_{B*}$, $I_{C*}$ for the stator windings from the excitation controller 54 on the leads 60, 62, 64, respectively, each have two components, a positive sequence current component ($I_{A+*}$, $I_{B+*}$, $I_{C+*}$) and a zero sequence current component ($I_{A0*}$, $I_{B0*}$, $I_{C0*}$). Positive sequence signals are a balanced set of signals that are equal in frequency and magnitude. Zero sequence signals are a set of signals that are equal in frequency and magnitude with zero phase displacement between the signals. The positive sequence current component $I_{A+*}$, $I_{B+*}$, $I_{C+*}$ are a balanced set of current signals that are equal in magnitude and frequency and displaced from each other by 120° in phase, whereas the zero sequence current components $I_{A0*}$, $I_{B0*}$, $I_{C0*}$ are current signals that are equal in magnitude and frequency with zero (0) phase displacement from each other. It is important to note that while zero sequence current signals are used in the present invention, zero sequence current signals are not absolutely required for the present invention. In fact, the current signals $I_{A0*}$, $I_{B0*}$, $I_{C0*}$ can have different magnitudes, so long as they have the same frequency and zero phase displacement. For purposes of the present invention, however, the current signals $I_{A0*}$, $I_{B0*}$, $I_{C0*}$ will be referred to as zero sequence current signals and, therefore, the current signals $I_{A0*}$, $I_{B0*}$, $I_{C0*}$ will have identical magnitudes.

The actual current signal output $I_{A*}$ from the excitation controller 54 on the lead 60 is the sum of the positive sequence current component $I_{A+*}$ plus the zero sequence current component $I_{A0*}$, as shown by:

$$I_{A*} = I_{A+*} + I_{A0*} \tag{1}$$

Similarly, the actual current output signal $I_{B*}$ from the excitation controller 54 on the lead 62 is:

$$I_{B*} = I_{B+*} + I_{B0*} \tag{2}$$

Likewise, the actual current output signal $I_{C*}$ from the excitation controller 54 on the lead 64:

$$I_{C*} = I_{C+*} + I_{C0*} \tag{3}$$

The current output signals $I_{A*}$, $I_{B*}$, $I_{C*}$ from the excitation controller 54 on the leads 60, 62, 64, respectively, are also used in a feedback loop 59 along with the current sensors 120, 122, 124 to create input voltage signals to the excitation controller 54 on the leads 121, 123, 125, respectively. The voltage signals created by the current sensors 120, 122, 124 on the leads 121, 123, 125 are linearly related to the current signals $I_{A*}$, $I_{B*}$, $I_{C*}$ flowing on the leads 60, 62, 64. In general terms, if the amplitude of the current signal $I_{A*}$ is too low, the feedback loop 59 causes the excitation controller 54 to increase the amplitude of the current signal $I_{A*}$. If the amplitude of the current signal $I_{A*}$ is too high, the feedback loop 59 causes the excitation controller 54 to decrease the amplitude of the current signal $I_{A*}$. Likewise for the current signals $I_{B*}$ and $I_{C*}$. The excitation controller 54, the feedback loop 59, the current sensors 120, 122, 124, and the output current signals $I_{A*}$, $I_{B*}$, $I_{C*}$ from the excitation controller 54 on the leads 60, 62, 64, respectively, are discussed in greater detail below.

The positive sequence components $I_{A+*}$, $I_{B+*}$, $I_{C+*}$ of the current signals $I_{A*}$, $I_{B*}$, $I_{C*}$ created on the leads 60, 62, 64 by the excitation controller 54 are the input signals to the generator 52 and provide the balanced three phase excitation currents required in the stator windings of the generator 52 to generate the rotating magnetic field needed in the generator 52 to recover real power from the generator 52. The zero sequence filter 293 in the output circuit 56 prevents the positive sequence current components $I_{A+*}$, $I_{B+*}$, $I_{C+*}$ of the current signals $I_{A*}$, $I_{B*}$, $I_{C*}$ from passing through the output circuit 56 to the utility 58. The positive sequence current signals $I_{A+*}$, $I_{B+*}$, $I_{C+*}$ are equal in magnitude and are displaced from each other by 120° in phase. The positive sequence current signals $I_{A+*}$, $I_{B+*}$, $I_{C+*}$ have approximately the following waveforms:

$$I_{A+*} = I_{G*} \cos(\omega_+ t) \tag{4}$$

$$I_{B+*} = I_{G*} \cos(\omega_+ t - 120°) \tag{5}$$

where $I_{G*}$ is the magnitude of the positive sequence current signals $I_{A+*}$, $I_{B+*}$, $I_{C+*}$ and:

$$I_{C+*} = I_{G*} \cos(\omega_+ t + 120°) \tag{6}$$

$$\omega_+ = 2\Pi f_+ \tag{7}$$

The frequency $f_+$ of the positive sequence current signals $I_{A+*}$, $I_{B+*}$, $I_{C+*}$ is determined by the RPM information supplied to the excitation controller 54 on the lead 65 by the RPM converter 57 and is chosen by the excitation controller 54 so that the generator 52 generates maximum output power for each particular wind velocity. The frequency $f_+$ of the positive sequence current signals $I_{A+*}$, $I_{B+*}$, $I_{C+*}$ can be, for example, between sixty (60) and 120 hertz. The positive sequence current signals $I_{A+*}$, $I_{B+*}$, $I_{C+*}$ are discussed in more detail below.

Figure 9:
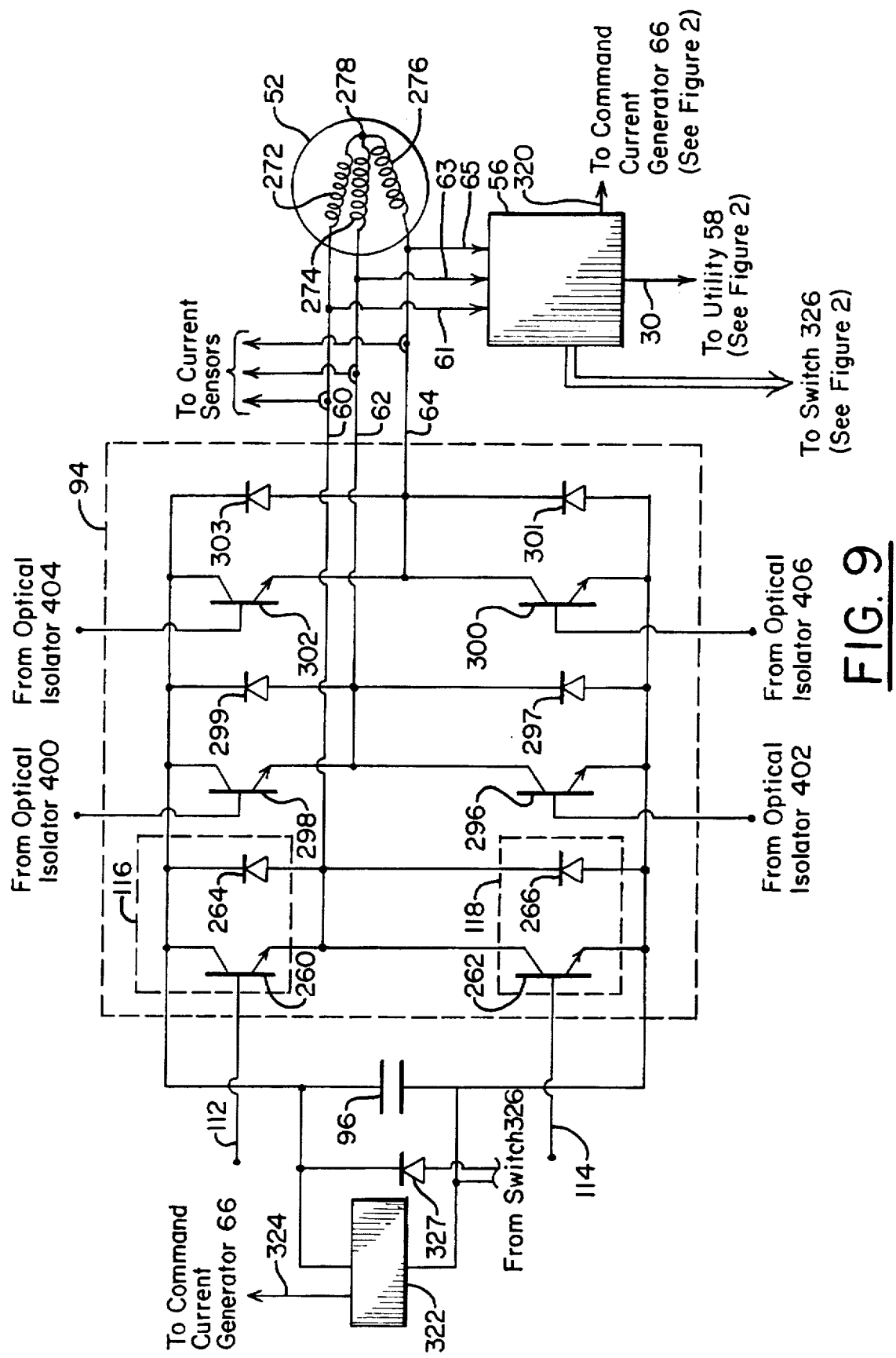
FIG. 9 shows a schematic diagram of the power converter portion of the electronic circuitry of the generator system of FIG. 1 constructed to use the voltage signals provided by the lock out circuit to create the desired output current signals.

The zero sequence components $I_{A0*}$, $I_{B0*}$, $I_{C0*}$ of the current signals $I_{A*}$, $I_{B*}$, $I_{C*}$ created on the leads 60, 62, 64 by the excitation controller 54 are the input signals to the output filter 293 and allow the real power generated by the generator 52 to be supplied to the utility 58. The zero sequence current signals $I_{A0*}$, $I_{B0*}$, $I_{C0*}$ are equal in magnitude, have a frequency of sixty (60) hertz, and have zero phase displacement from each other. The zero sequence current signals $I_{A0*}$, $I_{B0*}$, $I_{C0*}$ have approximately the following waveforms:

$$I_{A0*} = I_{F*} \cos(\omega_0 t) \qquad (8)$$

$$I_{B0*} = I_{F*} \cos(\omega_0 t) \qquad (9)$$

$$I_{C0*} = I_{F*} \cos(\omega_0 t) \qquad (10)$$

where $I_{F*}$ is the magnitude of the zero sequence current signals $I_{A0*}$, $I_{B0*}$, $I_{C0*}$, and:

$$\omega_0 = 2\Pi f_0 \qquad (11)$$

where the frequency $f_0$ of the zero sequence current signals $I_{A0*}$, $I_{B0*}$, $I_{C0*}$ is sixty (60) hertz. The star connection of the impedances 272, 274, 276 in the stator windings of the generator 52, as shown in FIG. 9, prevents the zero sequence currents $I_{A0*}$, $I_{B0*}$, $I_{C0*}$ from entering the generator 52, since the total current entering or exiting the node 278 in the generator 52 must be equal to zero.

In order to have the real power created by the generator 52 delivered to the utility 58 at unity power factor, the zero sequence current signals $I_{A0*}$, $I_{B0*}$, $I_{C0*}$ must be completely in phase with the voltage signal in the utility 58. As will be discussed in more detail below, this condition can be accomplished by using the voltage signal of the utility 58 as a template to force the zero sequence current signals $I_{A0*}$, $I_{B0*}$, $I_{C0*}$ to be in phase with the signals in the utility 58. The zero sequence current signals $I_{A0*}$, $I_{B0*}$, $I_{C0*}$ are also discussed in more detail below.

Figure 2:
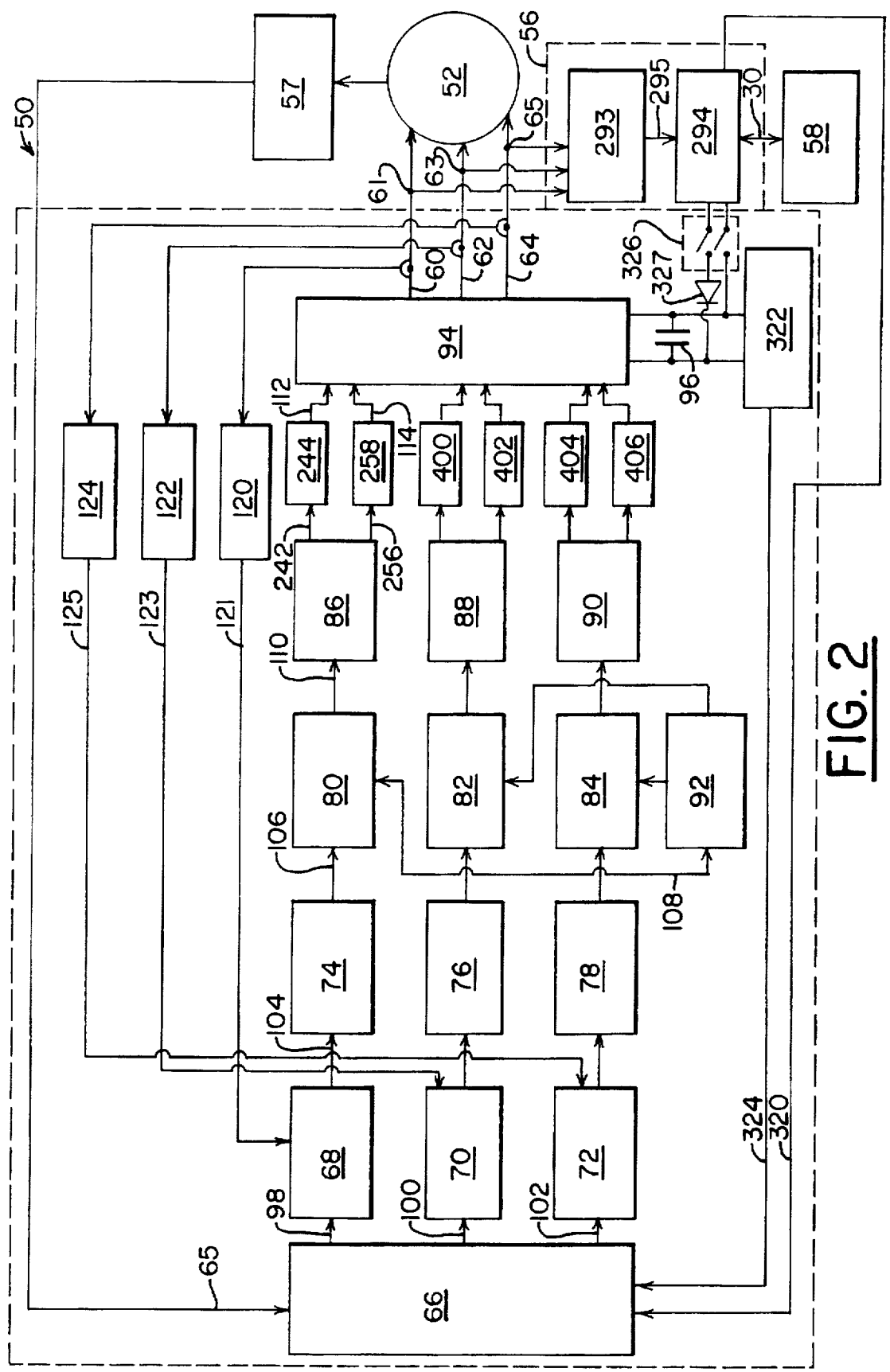
FIG. 2 shows a more detailed functional block diagram of the operative components and electronic circuitry of the generator system according to the present invention shown in FIG. 1.

Now referring to FIG. 2, the operational block diagram for the generator system 50 is shown in more detail. The excitation controller 54 includes the command current generator 66, the error detectors 68, 70, 72, the amplifiers 74, 76, 78, the comparators 80, 82, 84, the lock out circuits 86, 88, 90, the triangle waveform generator 92, the power converter 94, the capacitor 96, the current sensors 120, 122, 124, the voltage sensor 322, the optical isolators 244, 258, 400, 402, 404, 406, the switch 326, and the rectifier 327.

When the generator system 50 becomes operational, the switch 326 is closed and the voltage signals in the utility 58 are used along with the switch 326 and the rectifier 327 to charge the capacitor 96 to, for example, 800 volts. After the capacitor 96 is fully charged, the switch 326 is opened. When the rotor in the generator 52 begins to rotate due to the action of the wind, the RPM (revolutions per minute) converter 57 begins to continuously monitor or measure the RPM or angular velocity of the rotating rotor in the generator 52. RPM (revolutions per minute) is a measure of angular velocity or rotational speed of a rotating component or field, as is well-known to persons skilled in the art. Therefore, these terminologies are used interchangeably and are considered to be equivalents for purposes of this invention. The RPM converter 57 creates an output voltage signal on the lead 65 which is linearly proportional to the RPM or angular velocity of the rotating rotor in the generator 52 and which is also the input signal to the command current generator 66, as will be discussed in more detail below.

The command current generator 66 creates three voltage signals $V_A$, $V_B$, $V_C$ on the leads 98, 100, 102, respectively. The output voltage signals $V_A$, $V_B$, $V_C$ from the command current generator 66 each have two components, a positive sequence voltage component ($V_{A+}$, $V_{B+}$, $V_{C+}$) and a zero sequence voltage component ($V_{A0}$, $V_{B0}$, $V_{C0}$). Therefore, the voltage signal output from the command current generator 66 on the lead 98 is $V_A$ and:

$$V_A = V_{A+} + V_{A0} \qquad (12)$$

Likewise, the voltage signal output from the command current generator 66 on the lead 100 is $V_B$ and:

$$V_B = V_{B+} + V_{B0} \qquad (13)$$

Similarly, the voltage signal output from the command current generator 66 on the lead 102 is $V_C$ and:

$$V_C = V_{C+} + V_{C0} \qquad (14)$$

Figure 11:
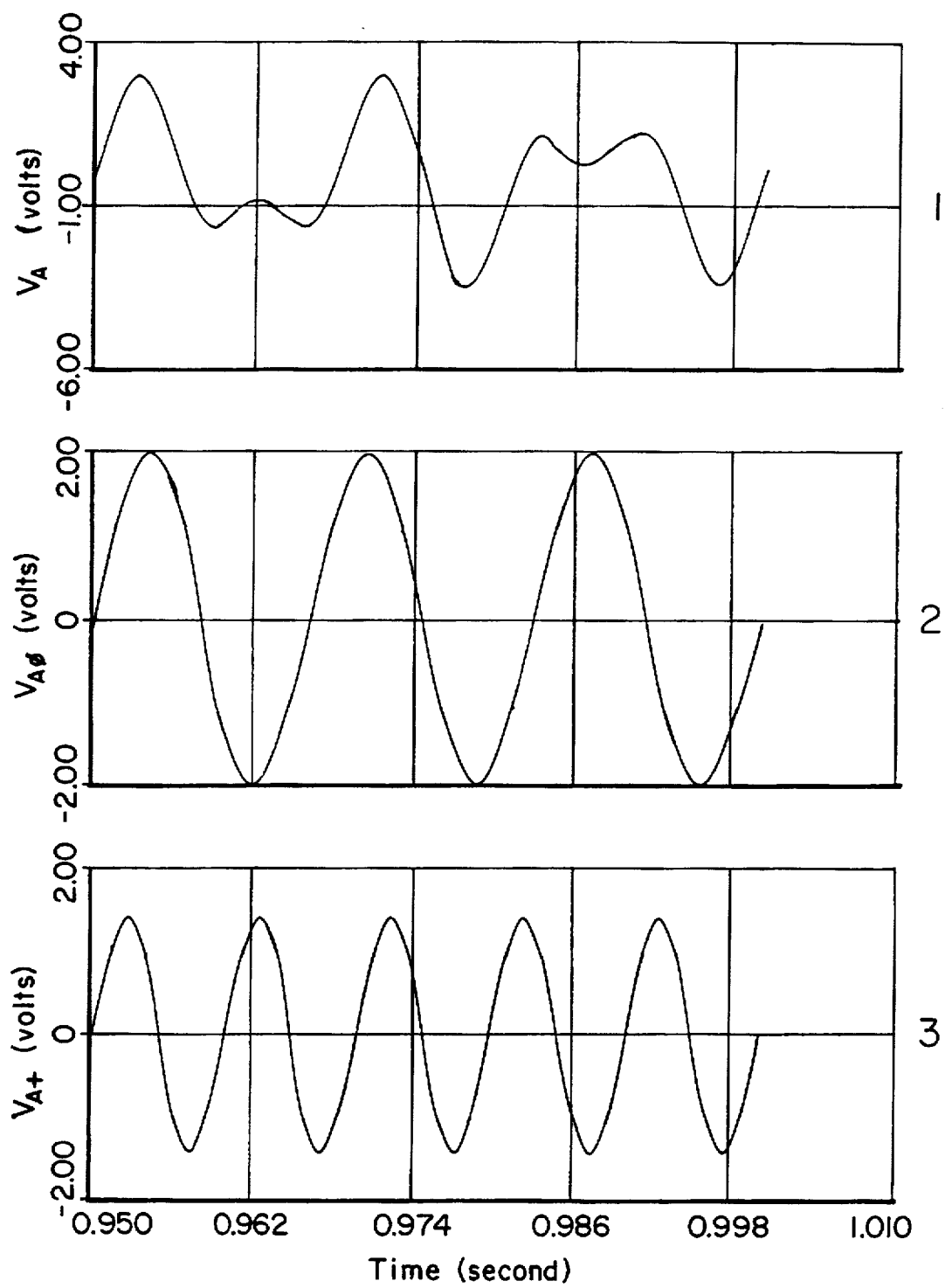
FIG. 11 shows an example voltage signal generated by the command current generator of the generator system of FIG. 1.

Referring to FIG. 11, an example waveform for the voltage signal $V_A$ is shown in graph 1.

Figure 12:
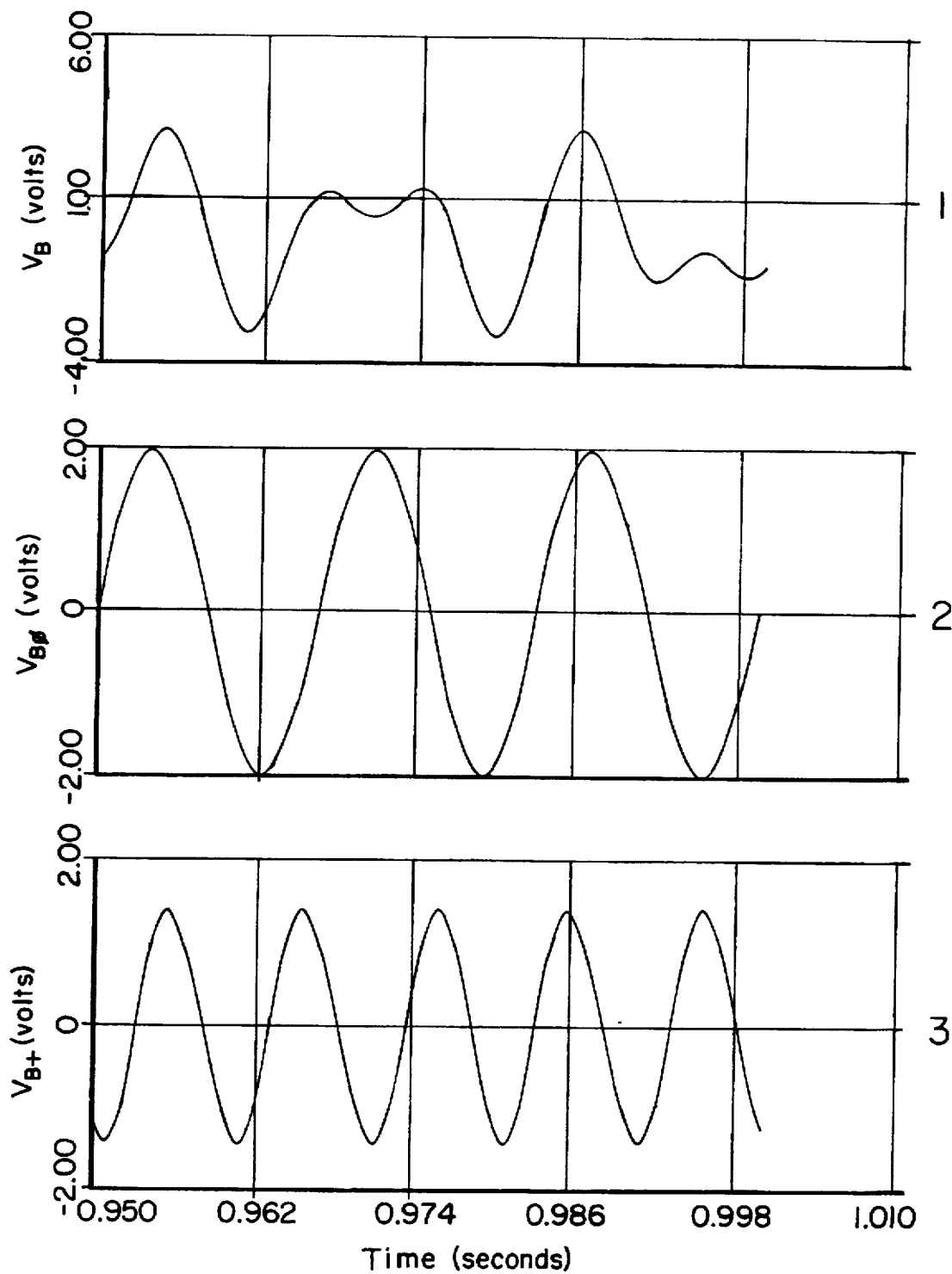
FIG. 12 shows another example voltage signal generated by the command current generator of the generator system of FIG. 1.
Figure 13:
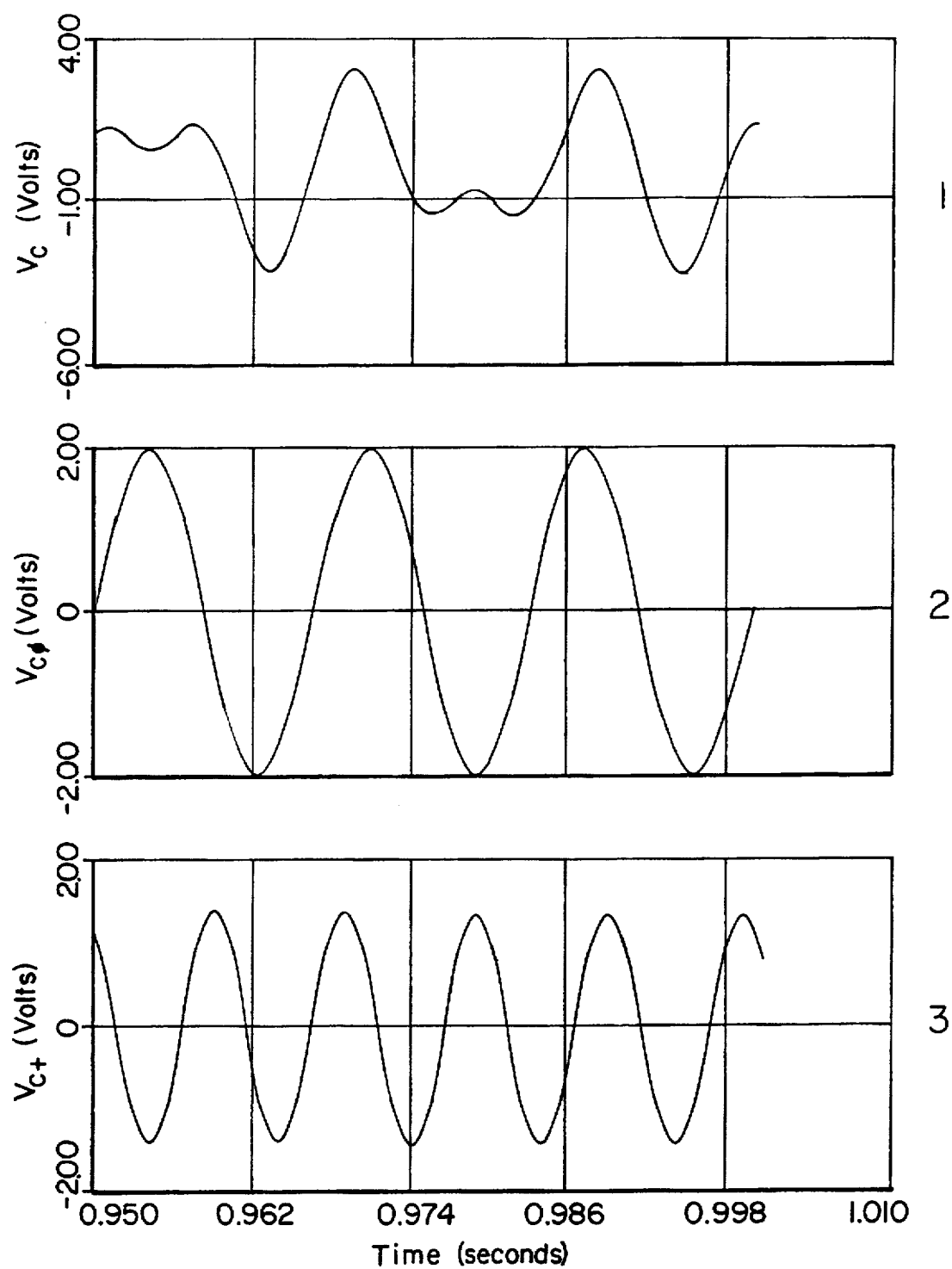
FIG. 13 shows another example voltage signal generated by the command current generator of the generator system of FIG. 1.

The voltage signal $V_A$ is composed of two voltage signals, $V_{A0}$ and $V_{A+}$, which are shown in graphs 2, 3, respectively, in FIG. 11. Referring to FIG. 12, an example waveform for the voltage signal $V_B$ is shown in graph 1. The voltage signal $V_B$ is composed of two voltage signals, $V_{B0}$ and $V_{B+}$, which are shown in graphs 2, 3, respectively, in FIG. 12. Referring to FIG. 13, an example waveform for the voltage signal $V_C$ is shown in graph 1. The voltage signal $V_C$ is composed of two voltage signals, $V_{C0}$ and $V_{C+}$, which are shown in graphs 2, 3, respectively, in FIG. 13. The voltage signals $V_A$, $V_{A0}$, $V_{A+}$, $V_B$, $V_{B0}$, $V_{B+}$, $V_C$, $V_{C0}$, $V_{C+}$ are discussed in more detail below. The use of a microprocessor to generate voltage signals is well known to people having ordinary skill in the art. For example, the 8088 manufactured by Intel can be used as the command current generator 66 in this invention.

As will be discussed in more detail below, the positive sequence voltage signals $V_{A+}$, $V_{B0+}$, $V_{C+}$ are linearly related to the positive sequence currents $I_{A+*}$, $I_{B+*}$, $I_{C+*}$, which are the input current signals to the windings of generator 52. The frequency of the three positive sequence voltage signals $V_{A+}$, $V_{B0+}$, $V_{C+}$ depends on the RPM of the rotor in the generator 52, which is dependent on the wind velocity and to some extent on the electrical load on the generator system. The higher the wind velocity acting on the wind turbine blades 12, of course, the more wind energy there is to drive the rotor at a higher RPM. The higher the electrical load on the generator, however, the more resistance there is to rotor rotation. Therefore, the actual RPM of the rotor at any particular time results from a balance between the wind velocity and the magnitude of the electrical load at that time. As previously discussed, the output power created by the generator 52 depends in part on the RPM of the rotor in the generator 52 and the frequency of the positive sequence current signals $I_{A+*}$, $I_{B+*}$, $I_{C+*}$ flowing in the stator windings of the generator 52. For a specific wind velocity and consequent RPM of the rotating rotor in the generator 52, there is a particular frequency for the positive sequence current signals $I_{A+*}$, $I_{B+*}$, $I_{C0+*}$ that maximizes the electrical energy or real power generated by the generator 52. The velocity of the wind is for a given load directly proportional to the RPM of the rotor in the generator 52, as described above, which is measured by the RPM converter 57. The RPM converter 57 is shown schematically connected to the generator 52 by the lead 65. The RPM converter 57 provides a continuous voltage signal to the command current generator 66 on the lead 65 that represents the RPM of the rotor in the generator 52.

The frequency $f_+$ of the positive sequence current signals $I_{A+*}$, $I_{B+*}$, $I_{C0+*}$ is equal to the frequency of the positive sequence voltage signals $V_{A+}$, $V_{B0+}$, $V_{C+}$, as will be described in more detail below. Therefore, the frequency of the positive sequence voltage signals $V_{A+}$, $V_{B0+}$, $V_{C+}$ is continuously adjusted by the command current generator 66 to create the frequency $f_+$ of the positive sequence current signals $I_{A+*}$, $I_{B+*}$, $I_{C+*}$ that maximizes the real power generated by the generator 52 at the varying wind velocities. The information relating the RPM of the rotor in the generator 52 to optimal frequency $F_+$ is stored in the command current generator 66 in, for example, a look-up table. The optimal frequency $F_+$ can also be computed from an equation or a set of equations that are stored in the command current generator 52 where the optimal frequency is a function of the RPM of the rotor in the generator 52. The relationship between the RPM of the rotor in the generator 52 and the optimal frequency $F_+$ can be computed by equations or determined empirically and can also be different for different types of generators. The positive sequence voltage signals $V_{A+}$, $V_{B0+}$, $V_{C+}$ generated by the command current generator 66 are equal in magnitude, are displaced from each other by 120° in phase, and have the following waveforms:

$$V_{A+} = V_G \cos(\omega_+ t) \quad (15)$$

$$V_{B+} = V_G \cos(\omega_+ t - 120°) \quad (16)$$

$$V_{C+} = V_G \cos(\omega_+ t + 120°) \quad (17)$$

where $V_G$ is the magnitude of the positive sequence voltage signals $V_{A+}$, $V_{B0+}$, $V_{C+}$. The $\omega_+$ in the equations 15–17 is the same as the $\omega_+$ in the equations 4–6.

As will be discussed in more detail below, the zero sequence voltages $V_{A0}$, $V_{B0}$, $V_{C0}$ are linearly related to the zero sequence current signals $I_{A0*}$, $I_{B0*}$, $I_{C0*}$, which are the input current signals to the output filter 56 that allow the generated power to be delivered to the utility 58. The zero sequence voltage signals $V_{A0}$, $V_{B0}$, $V_{C0}$ are equal in magnitude, have a frequency of sixty (60) hertz, have zero phase displacement from each other, and have the following waveforms:

$$V_{A0} = V_F \cos(\omega_0 t) \quad (18)$$

$$V_{B0} = V_F \cos(\omega_0 t) \quad (19)$$

$$V_{C0} = V_F \cos(\omega_0 t) \quad (20)$$

where $V_F$ is the magnitude of the zero sequence voltage signals $V_{A0}$, $V_{B0}$, $V_{C0}$. The $\omega_0$ in the equations 18–20 is also the same as the $\omega_0$ in the equations 8–10. As previously discussed, the zero sequence current signals $I_{A0*}$, $I_{B0*}$, $I_{C0*}$ must be completely in phase with the voltage signal in the utility 58 so that the power supplied to the utility has a unity power factor. This objective can be accomplished by using the voltage signal of the utility 58 as a template to force the zero sequence current signals $I_{A0*}$, $I_{B0*}$, $I_{C0*}$ to be in phase with the voltage signal in the utility 58. More specifically, the transformer 294 creates a voltage signal on the lead 320 that is in phase with the voltage signal in the utility 58. The command current generator 66 creates the zero sequence voltage signals $V_{A0}$, $V_{B0}$, $V_{C0}$ on the leads 98, 100, 102, respectively, with the needed phase so that the zero sequence current signals $I_{A0*}$, $I_{B0*}$, $I_{C0*}$ from the power converter 94 on the leads 60, 62, 64, respectively, are completely in phase with the voltage signal in the utility 58.

The output voltage signal $V_A$ from the command current generator 66 on the lead 98 is an input signal to the error detector 68. Likewise, the output voltage signal $V_B$ from the command current generator 66 on the lead 100 is an input signal to the error detector 70, and the output voltage signal $V_C$ from the command current generator 66 on the lead 102 is an input signal to the error detector 72.

The current sensor 120 senses the current signal $I_{A*}$ produced on the lead 60 by the power converter 94 and creates a corresponding voltage signal $V_{A*}$ on the lead 121. Likewise, the current sensor 122 senses the current signal $I_{B*}$ produced on the lead 62 by the power converter 94 and creates a corresponding voltage signal $V_{B*}$ on the lead 123, and the current sensor 124 senses the current signal $I_{C*}$ produced on the lead 64 by the power converter 94 and creates a corresponding voltage signal $V_{C*}$ on the lead 125. The current sensors 120, 122, 124 do not disturb or change the current signals $I_{A*}$, $I_{B*}$, $I_{C*}$ on the leads 60, 62, 64. Current sensors and the use of current sensors are well known to people having ordinary skill in the art and need not be described in any further detail.

The output voltage signal $V_{A*}$ from the current sensor 120 on the lead 121 is an input signal to the error detector 68. Likewise, the output voltage signal $V_{B*}$ from the current sensor 122 on the lead 123 is an input signal to the error detector 70 and the output voltage signal $V_{C*}$ from the current sensor 124 on the lead 125 is an input signal to the error detector 72.

The signal processing of the voltage signals $V_A$, $V_{A*}$ in the error detector 68, the amplifier 74, the comparator 80, the lockout circuit 86, and the optical isolators 244, 258 is identical to the signal processing of the voltage signals $V_B$, $V_{B*}$ in the error detector 70, the amplifier 76, the comparator 82, the lockout circuit 88, and the optical isolators 400, 402, which are both identical to the signal processing of the voltage signals $V_{C*}$, $V_{C*}$ in the error detector 72, the amplifier 78, the comparator 84, the lockout circuit 90, and the optical isolators 404, 406. Therefore, only the signal processing for the voltage signals $V_A$ and $V_{A*}$ is discussed in further detail.

The error detector 68 determines the difference between the voltage signal $V_A$ created by the command current generator 66 on the lead 98 and the voltage signal $V_{A*}$ created by the current sensor 120 on the lead 121. The difference between the two voltage signals $V_A$, $V_{A*}$ is the error voltage signal $V_{Aerr}$ which is also the output signal from the error detector 68 on the lead 104 and the input signal to the amplifier 74. The amplifier 74 amplifies the voltage signal $V_{Aerr}$ to strengthen it and provide a stronger input signal to the comparator 80. The output voltage signal $V_{Aamp}$ from the amplifier 74 on the lead 106 is an input voltage signal to the comparator 80. The error detector 68 and the amplifier 74 are discussed in more detail below.

Figure 3:
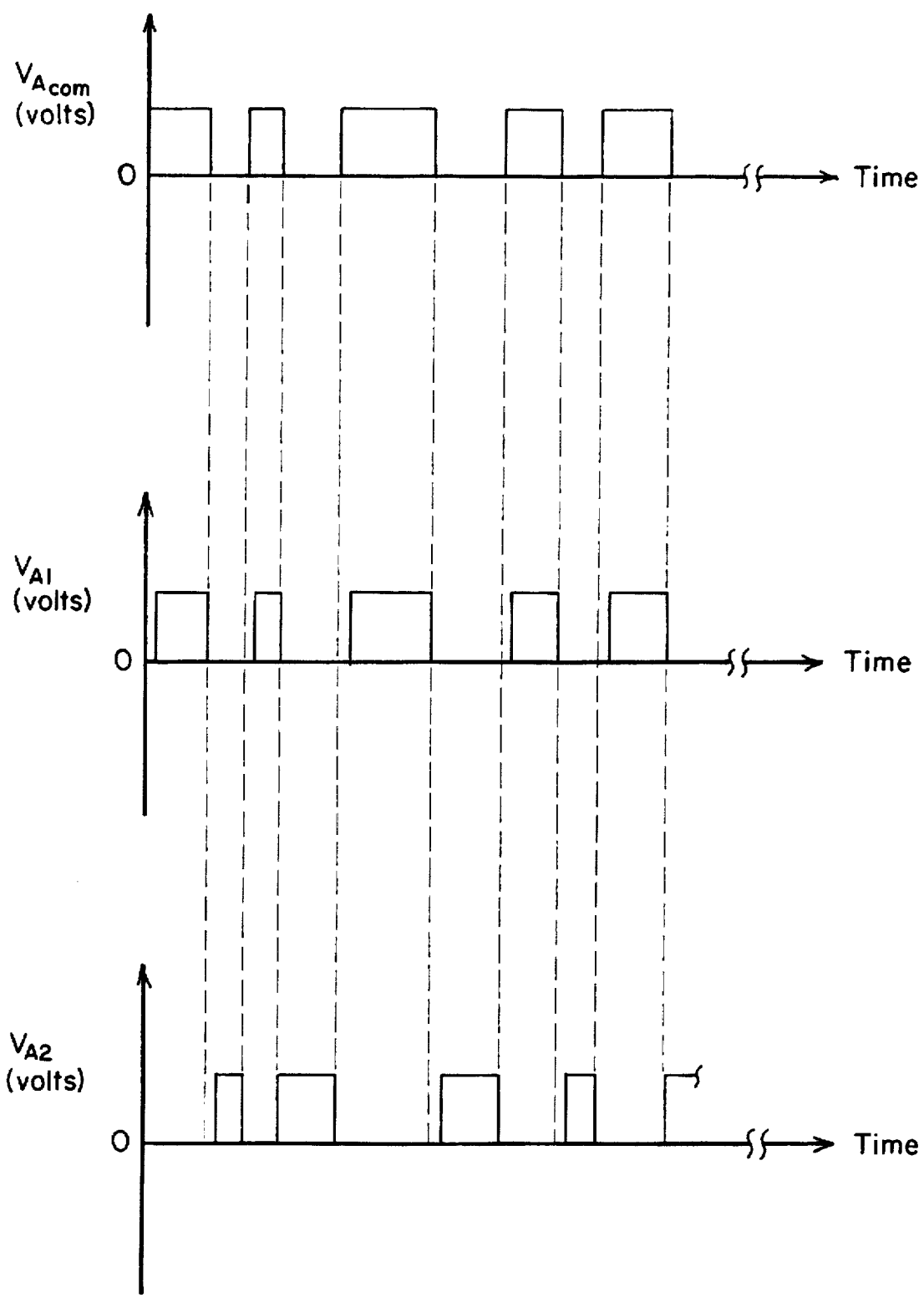
FIG. 3 shows a comparison of the input voltage signal to and the output voltage signals from the lock out circuit portion of the generator system according to the present invention shown in FIG. 1.

The comparator 80 continuously compares the input voltage signal $V_{Aamp}$ on the lead 106 with the input voltage signal $V_{Atri}$ on the lead 108. The voltage signal $V_{Atri}$ on the lead 108 is the output signal from the triangle waveform generator 92. The voltage signal $V_{Atri}$ has a triangular waveform and a frequency of, for example, 5,000 hertz. If the instantaneous amplitude of the voltage signal $V_{Atri}$ is greater than the instantaneous amplitude of the voltage signal $V_{Aamp}$, the output voltage signal $V_{Acom}$ from the comparator 80 on the lead 110 is approximately a five (5) volt voltage signal. If the instantaneous amplitude of the voltage signal $V_{Atri}$ is less than the instantaneous amplitude of the voltage signal $V_{Aamp}$, the output voltage signal $V_{Acom}$ from the comparator 80 on the lead 110 is approximately a zero (0) voltage signal. Therefore, the output voltage signal $V_{Atri}$ from the comparator 80 on the lead 110 is a nonperiodic pulsed signal where the duration of each pulse is linearly related to the amount of time that the amplitude of the voltage signal $V_{Atri}$ is greater than the amplitude of the voltage signal $V_{Aamp}$ and the duration between pulses is linearly related to the amount of time that the amplitude of the voltage signal $V_{Atri}$ is less than the amplitude of the voltage signal $V_{Aamp}$. An example waveform for the voltage signal $V_{Acom}$ is shown in FIG. 3. The comparator 80 is discussed in more detail below.

The output voltage signal $V_{Acom}$ from the comparator 80 on the lead 110 is the input signal to the lock out circuit 86. The lock out circuit 86 converts the pulsed voltage signal $V_{Acom}$ into two distinct pulsed voltage signals $V_{A1}$, $V_{A2}$. The pulses of the voltage signals $V_{Acom}$, $V_{A1}$, $V_{A2}$ are shown in FIG. 3. The pulsed voltage signals $V_{A1}$, $V_{A2}$ have a minimum value of approximately zero volts and a maximum value of, for example, five volts. As shown in FIG. 3, the voltage signals $V_{A1}$, $V_{A2}$ never have their maximum value simultaneously due to the delay created by the lock out circuit 86. That is, while the voltage signal $V_{A1}$ is at its maximum value, the voltage signal $V_{A2}$ is at its minimum value, and vice versa. The voltage signals $V_{A1}$, $V_{A2}$ can, however, have their minimum values simultaneously, as shown in FIG. 3. The lock out circuit 86 is discussed in more detail below.

The output voltage signals $V_{A1}$, $V_{A2}$ from the lock out circuit 86 on the leads 242, 256 are the input signals the optical isolators 244, 258. The output voltage signal $V_{A1}$ from the optical isolator 244 on the lead 112 is the same as the input voltage signal to the optical isolator 244 on the lead 242. Similarly, the output voltage signal $V_{A2}$ from the optical isolator 258 on the lead 114 is the same as the input voltage signal to the optical isolator 258 on the lead 256. The optical isolator 244 electrically isolates the leads 242, 112 so that there is no direct electrical connection between the leads 242, 112. Similarly, the optical isolator 258 electrically isolates the leads 256, 114 so that there is no direct electrical connection between the leads 256, 114. The optical isolators 244, 258 provide electrical isolation and protection for the circuit from the power generated by the generator 52.

The output voltage signals from the optical isolators 244, 258 are the input signals to the power converter 94 on the leads 112, 114, respectively. The voltage signals $V_{A1}$ and $V_{A2}$ activate power switches 116, 118 (shown in FIG. 9), respectively. Selectively turning the power switches 116 and 118 "on" and "off" enables the power converter 94 to increase or decrease the current signal $I_{A*}$ flowing on the lead 60. For example, if the current $I_{A*}$ is positive, turning the power switch 116 "on" and the power switch 118 "off" allows current to flow positively through the power switch 116 to increase the current $I_{A*}$. Turning the power switch 116 "off" and the power switch 118 "on" allows current to flow negatively through the power switch 118 to decrease the current $I_{A*}$. If the current $I_{A*}$ is negative, turning the power switch 116 "on" and the power switch 118 "off" allows current to flow negatively through the power switch 116 to increase the current $I_{A*}$. Turning the power switch 116 "off" and the power switch 118 "on" allows current to flow positively through the power switch 118 to decrease the current $I_{A*}$. Because the voltage signals $V_{A1}$, $V_{A2}$ will never have their maximum values at the same time, the power switches 116, 118 will never be on at the same time. By controlling the voltage signals $V_{A1}$, $V_{A2}$ the power switches 116 and 118 can be selectively and individually switched on and off in such a way that any desired output current signal $I_{A*}$ can be produced on the lead 60, including a current signal $I_{A*}$ that maximizes the generated power and maximizes the power transfer to the utility 58.

Ideally, the current signal $I_{A*}$ produced on the lead 60 by the power converter 94 is a smooth current signal. Creating a smooth current signal $I_{A*}$, however, requires that the power switches 116 and 118 be able to turn on an off at an extremely high frequency, which may be practically impossible. In addition, there is a power loss in the power switches 116, 118 every time the power switches 116, 118 are turned on or off. Therefore, in the preferred embodiment of the generator system 50, the frequency of the switching of the power switches 116, 118 is limited to extend the useful life of the power switches 116, 118 by the action of the comparator 80 and the triangular waveform generator 92 to the frequency of the triangular waveform signal created by the triangular waveform generator 92.

As discussed above, a feedback loop is created with the command current generator 66, the error detector 68, the amplifier 74, the comparator 80, the lock out circuit 86, the optical isolators 244, 258, the power converter 94, the capacitor 96, the current sensor 120, and the voltage sensor 322. If the amplitude of the current signal $I_{A*}$ from the power converter 94 on the lead 60 is too low, the current sensor 120, the voltage sensor 322, the command current generator 66, the error detector 68, the amplifier 74, the comparator 80, the lock out circuit 86, and the optical isolators 244, 258 cause the power converter 94 and the capacitor 96 to increase the amplitude of the current signal $I_{A*}$. If the amplitude of the current signal $I_{A*}$ from the power converter 94 on the lead 60 is too high, the voltage sensor 322, the current sensor 120, the command current generator 66, the error detector 68, the amplifier 74, the comparator 80, the lock out circuit 86, and the optical isolators 244, 258 cause the power converter 94 and the capacitor 96 to decrease the amplitude of the current signal $I_{A*}$. The power circuit 94, the capacitor 96, the power switches 116, 118, and the operation of the feedback loop are discussed in more detail below.

As previously discussed, the output current signals $I_{A*}$, $I_{B*}$, $I_{C*}$ from the power converter 94 on the leads 60, 62, 64, respectively, each have two components, a positive sequence current component ($I_{A+*}$, $I_{B+*}$, $I_{C+*}$) and a zero sequence current component ($I_{A0*}$, $I_{B0*}$, $I_{C0*}$). The current output signal from the power converter 94 on the lead 60 is $I_{A*}$ and:

$$I_{A*} = I_{A+*} + I_{A0*} \tag{21}$$

The current output signal from the power converter 94 on the lead 62 is $I_{B*}$ and:

$$I_{B*} = I_{B+*} + I_{B0*} \tag{22}$$

The current output signal from the power converter 94 on the lead 64 is $I_{C*}$ and:

$$I_{C*} = I_{C+*} + I_{C0*} \tag{23}$$

Therefore, from equations 4–6, 8–10, and 21–23, $$I_{A*} = I_{G*} \cos(\omega_+ t) + I_{F*} \cos(\omega_0 t + \alpha) \tag{24}$$

$$I_{B*} = I_{G*} \cos(\omega_+ t - 120°) + I_{F*} \cos(\omega_0 t + \alpha) \tag{25}$$

$$I_{C*} = I_{G*} \cos(\omega_+ t + 120°) + I_{F*} \cos(\omega_0 t + \alpha) \tag{26}$$

As previously discussed and as will be discussed in more detail below, the current signals $I_{A*}$, $I_{B*}$, $I_{C*}$ supply the current necessary to excite the stator windings in the generator 52 and to deliver the generated power to the utility 58. More importantly, the frequency $f_+$ of the positive sequence current components $I_{A+*}$, $I_{B+*}$, $I_{C+*}$ of the current signals $I_{A*}$, $I_{B*}$, $I_{C*}$ is continuously adjusted by the command current generator 66 in response to the varying wind velocity to the frequency that maximizes the real power generated by the generator 52. In addition, the magnitude $I_F$ of the zero sequence current components $I_{A0*}$, $I_{B0*}$, $I_{C0*}$ of the current signals $I_{A*}$, $I_{B*}$, $I_{C*}$ is continuously adjusted by the command current generator 66 to ensure that all of the real power generated by the generator 52 is transferred to the utility 58. The real power transferred to the utility 58 is single phase, sinusoidal, and has a unity power factor at sixty (60) hertz.

Figure 5:
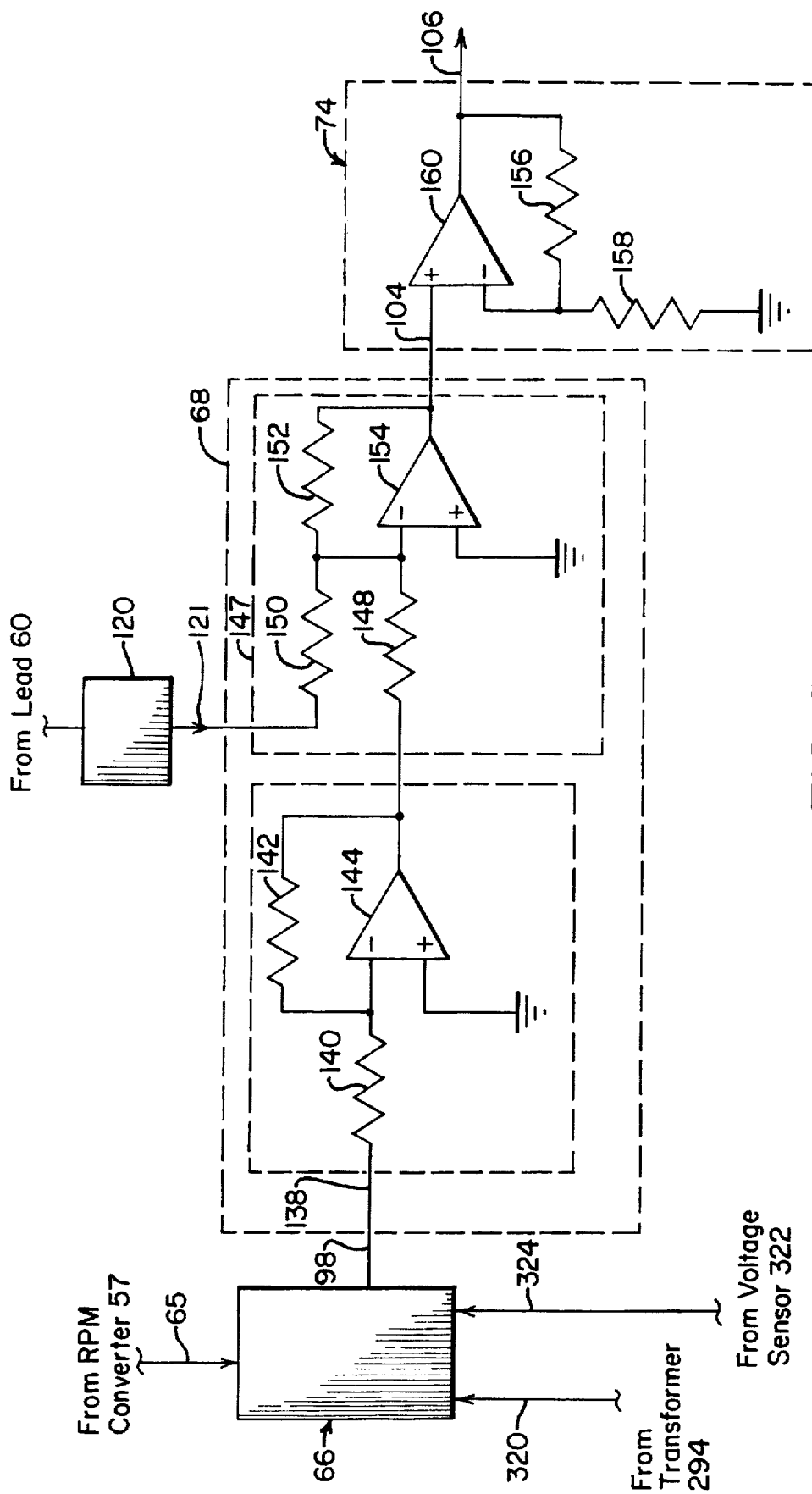
FIG. 5 shows a schematic diagram of the error detector and the amplifier portions of the electronic circuitry of the generator system of FIG. 1 constructed to create a signal representing the difference between the signals generated by the command current generator and the signals generated by the power converter.

More detailed exemplary schematic diagrams for the significant parts of the electronic circuitry in the generator system 50 are shown in FIGS. 5–10. Referring now to FIG. 5, the output voltage signal $V_A$ from the command current generator 66 on the lead 98 is an input signal to the error detector 68. In addition, the output voltage signal $V_{A*}$ from the current sensor 120 on the lead 121 is also an input signal to the error detector 68. The input voltage signal $V_A$ on the lead 98 passes through the inverter 138 formed by the resistor 140, the resistor 142, and the operational amplifier 144. If the resistor 140 and the resistor 142 are equal in value, for example, if they are both equal to 10,000 ohms, the output voltage signal from the inverter 138 on the lead 146 is equal to $-V_{A*}$.

The voltage signal $-V_A$ from the inverter 138 on the lead 146 and the voltage signal $V_{A*}$ on the lead 121 are the input signals to the summing circuit 147 formed by the resistor 148 ($R_{148}$), the resistor 150 ($R_{150}$), the resistor 152 ($R_{152}$), and the operational amplifier 154. The resistor 148, the resistor 150, and the resistor 152 can have equal values, for example, all three can be 10,000 ohms. The output voltage signal from the summing circuit 147 and the error detector 68 on the lead 68 is $V_{Aerr}$, the difference between the two voltage signals $V_A$ and $V_{A*}$. The voltage signal $V_{Aerr}$ is equal to:

$$V_{Aerr} = \frac{R_{152}V_A}{R_{148}} - \frac{R_{152}V_{A*}}{R_{150}} \quad (27)$$

Therefore, if the resistors 148, 150, 152 have equal values, then:

$$V_{Aerr} = V_A - V_{A*} \quad (28)$$

The output voltage signal $V_{Aerr}$ from the error detector 68 on the lead 104 is the input signal to the non-inverting amplifier 74 which amplifies the voltage signal $V_{Aerr}$ to strengthen the voltage signal. The amplifier 74 includes the resistor 156 ($R_{156}$), the resistor 158 ($R_{158}$), and the operational amplifier 160. The resistor 156 can have a value of, for example, 10,000 ohms. The resistor 158 can have a value of, for example, 10,000 ohms. The amplified output voltage signal $V_{Aamp}$ from the amplifier 74 on the lead 106 is equal to:

$$V_{Aamp} = \frac{R_{158} + R_{156}}{R_{158}} V_{Aerr} \quad (29)$$

The output voltage signal $V_{Aamp}$ from the amplifier 74 on the lead 106 is an input signal to the comparator 80.

Figure 6:
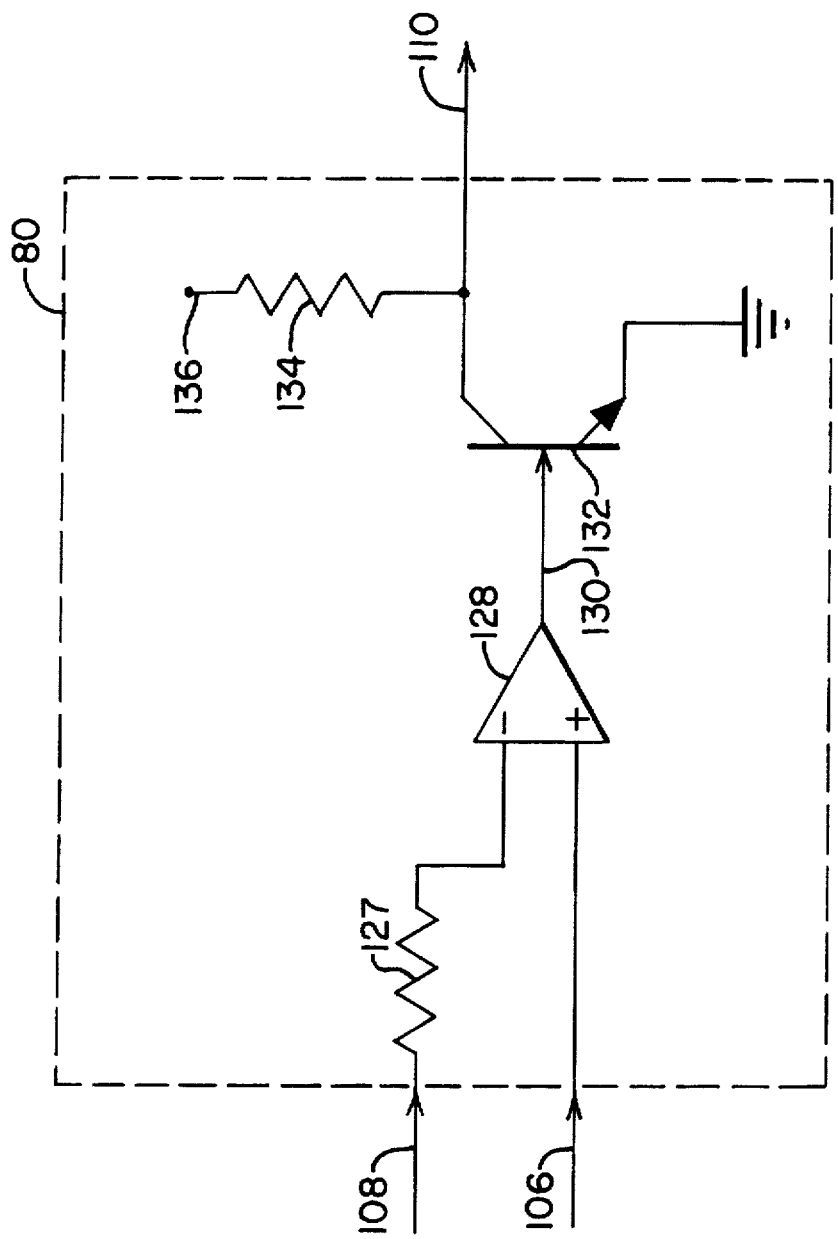
FIG. 6 shows a schematic diagram of the comparator portion of the electronic circuitry of the generator system of FIG. 1 constructed to compare the output of the amplifier with the output of the triangle wave generator.
Figure 7:
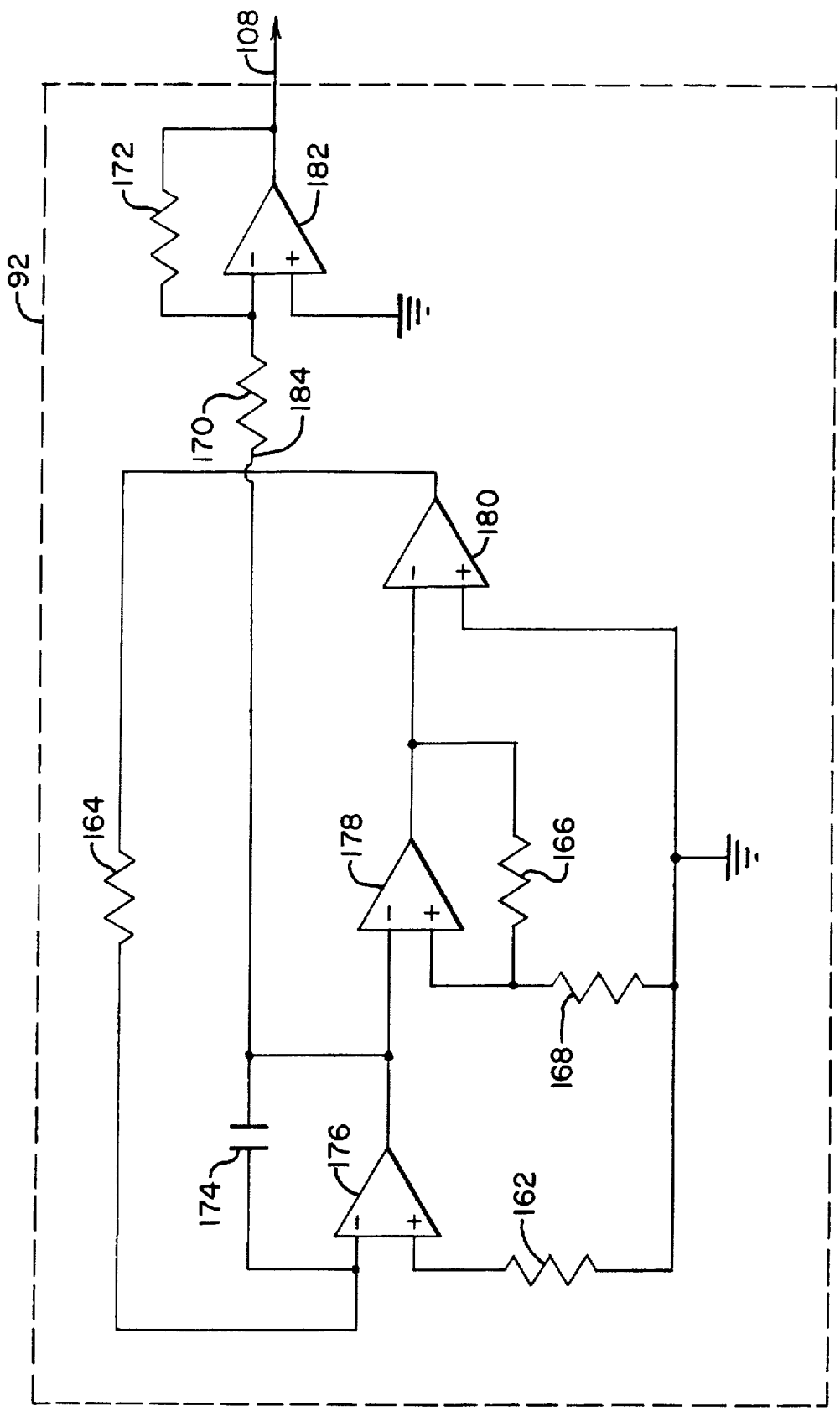
FIG. 7 shows a schematic diagram of the triangle wave generator portion of the electronic circuitry of the generator system of FIG. 1 constructed to provide a triangle waveform voltage signal to the comparator.

Now referring to FIG. 6, the comparator 80 has an input voltage signal $V_{Aamp}$ on the lead 106 from the amplifier 74 and an input voltage signal $V_{Atri}$ on the lead 108 from the triangle waveform generator 92. The triangle waveform generator 92, as shown in FIG. 7, includes the resistors 162, 164, 166, 168, 170, 172, the capacitor 174, and the operational amplifiers 176, 178, 180, 182. The resistor 162 can have a value of, for example, 10,000 ohms. The resistor 164 can have a value of, for example, 10,000 ohms. The resistor 166 can have a value of, for example, 10,000 ohms. The resistor 168 can have a value of, for example, 30,000 ohms. The resistor 170 can have a value of, for example, 10,000 ohms. The resistor 172 can have a value of, for example, 20,000 ohms. The capacitor 174 can have a value of, for example, 0.01 microfarads.

The resistors 162, 164, 166, 168, the capacitor 174, and the operational amplifiers 176, 178, 180 create a triangle wave voltage signal on the lead 184 which is the input signal to the inverting amplifier composed of the resistors 170, 172 and the operational amplifier 182. The output triangular wave voltage signal $V_{Atri}$ from the operational amplifier 182 on the lead 108 is an amplified version of the triangle wave voltage signal on the lead 184. The triangular wave voltage signal $V_{Atri}$ on the lead 108 is an input signal to the comparator 80.

Referring back to FIG. 6, the comparator 80 includes the resistors 127, 134, the voltage comparator 128, the transistor 132, and the DC voltage signal provided by a power supply (not shown) on the lead 136. The resistor 127 is used to prevent saturation of the voltage comparator 128. As previously discussed, the comparator compares the two voltage signals $V_{Atri}$, $V_{Aamp}$. If the voltage signal $V_{Atri}$ is higher that the voltage signal $V_{Aamp}$, the output of the voltage comparator 128 on the lead 130 is a low logic signal and a large negative voltage signal. Conversely, if the voltage signal $V_{Atri}$ is less than the voltage signal $V_{Aamp}$, the output of the voltage comparator 128 on the lead 130 is a high logic signal and a large positive voltage signal. The output voltage signal from the voltage comparator 128 on the lead 130 is the input signal to the transistor 132.

If the output signal from the voltage comparator 128 on the lead 130 has a high voltage level, the transistor 132 will be activated and the voltage output signal $V_{Acom}$ from the comparator 80 on the lead 110 will have a value of approximately zero volts. If the output signal from the voltage comparator 128 on the lead 130 has a low voltage level, the transistor 132 will not be activated and the output voltage signal $V_{Acom}$ from the comparator 80 on the lead 110 will have be approximately the same voltage that is on the lead 136. The resistor 127 can have a value of, for example, 1,000 ohms. The resistor 134 can have a value of, for example, 10,000 ohms. The DC voltage level on the lead 136 can be, for example, five volts. The LM311 Voltage Comparator manufactured by the National Semiconductor Corporation can be used as the voltage comparator 128 in this invention.

Figure 4:
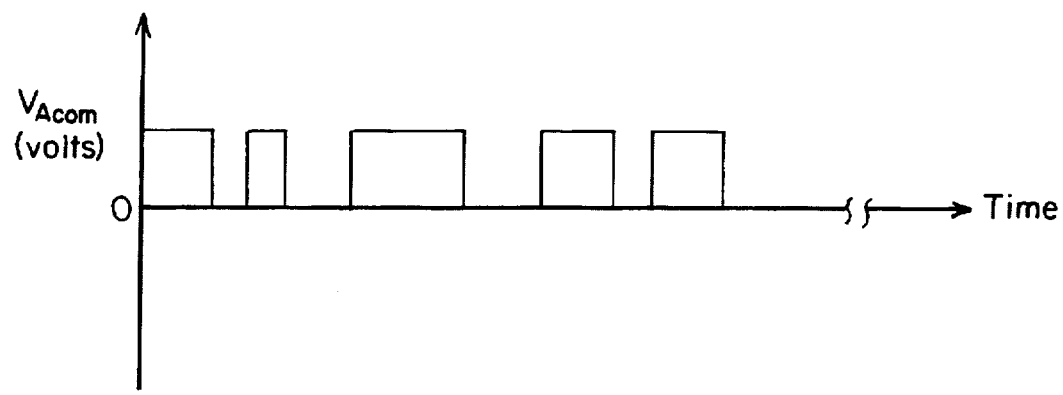
FIG. 4 shows a comparison of the input voltage signal to the lock out circuit and some of the voltage signals created in the lock out circuit of the generator system according to the present invention shown in FIG. 1.
Figure 4:
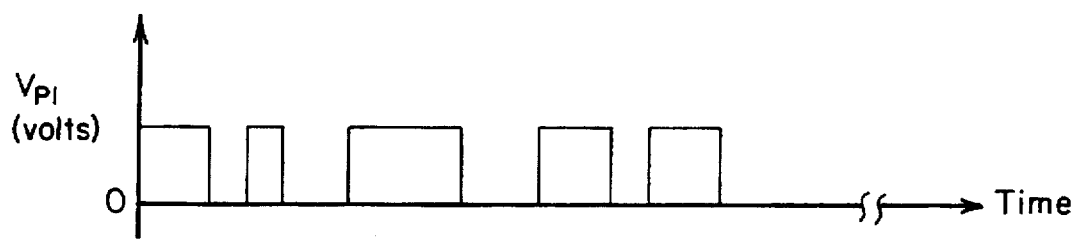
Figure 4:
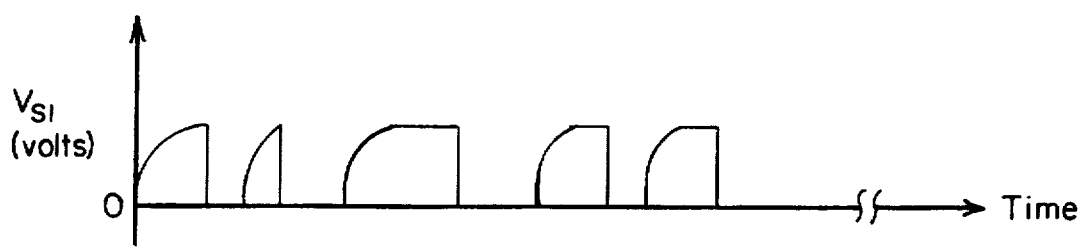
Figure 4:
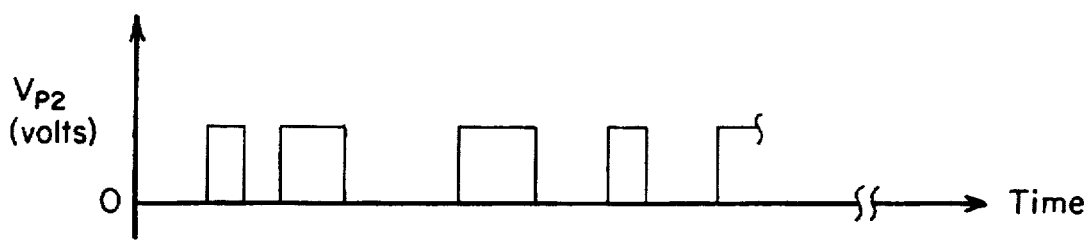
Figure 4:
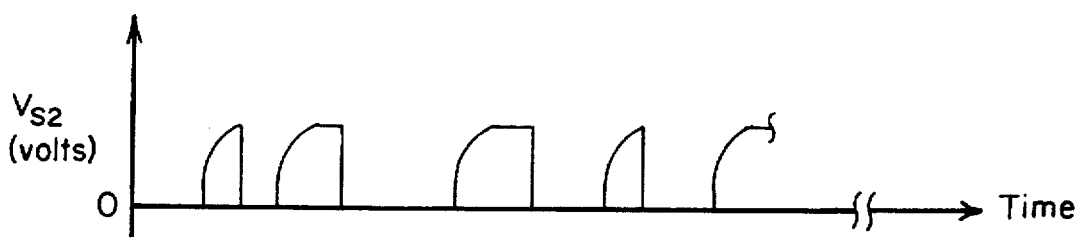
Figure 8:
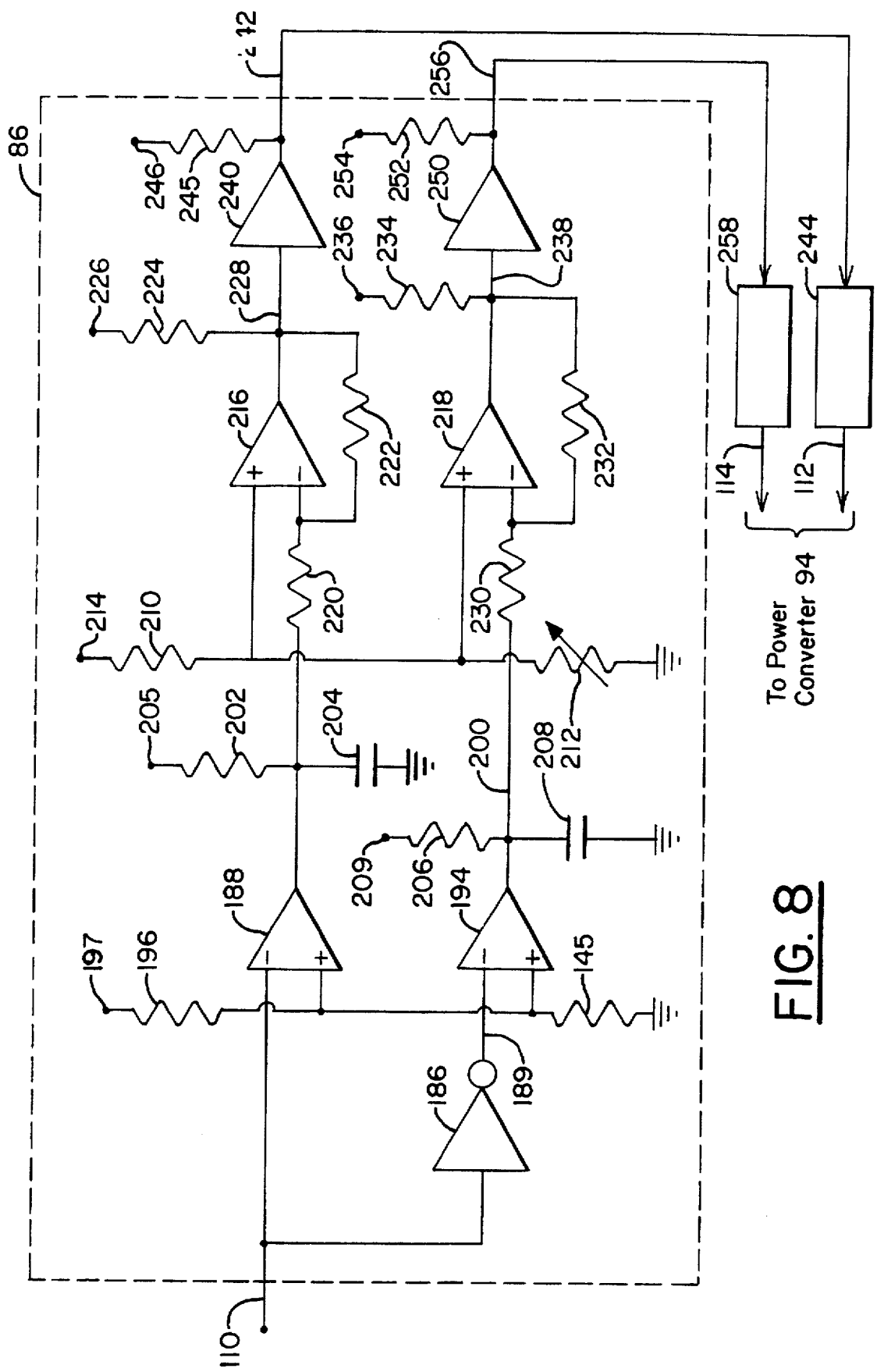
FIG. 8 shows a schematic diagram of the lock out circuit portion of the electronic circuitry of the generator system of FIG. 1 constructed to provide two pulse voltage signals to the power converter.

Now referring to FIG. 8, the output voltage signal $V_{Acom}$ from the comparator 80 on the lead 110 is the input signal to the lock out circuit 86. The voltage signal $V_{Acom}$ is the input signal to the logic inverter 186 and an input signal to the operational amplifier 188. The logic inverter 186, the operational amplifiers 188, 194, the resistors 195, 197, and the DC voltage level on the lead 197 are used to create two pulsed voltage signals $V_{P1}$, $V_{P2}$ on the leads 198, 200 having sharp defined and non-skewed edges. The two pulsed voltage signals $V_{P1}$, $V_{P2}$ have opposite logical values. That is, when the voltage signal $V_{P1}$ has a high logic value, the voltage signal $V_{P2}$ will have a low logic value, and vice versa. The voltage signals $V_{Acom}$, $V_{P1}$, $V_{P2}$ are shown in FIG. 4. While the voltage signal $V_{Acom}$ shown in FIGS. 3 and 4 has a sharp pulse waveform with no skewed or slanted edges, the voltage signal $V_{Acom}$ can, in actuality, have skewed edges or a minimum value greater than or less than zero volts. Therefore, it is preferred to create the sharper edged voltage signals $V_{P1}$, $V_{P2}$.

The logic inverter 186 converts a high logic voltage signal on the lead 110 to a low logic voltage signal on the lead 189 and converts a low logic voltage signal on the lead 110 to a high logic voltage signal on the lead 189. The output voltage signal from the inverter 186 on the lead 189 is an input signal to the operational amplifier 194. By using the inverter 186, the logic voltage signal on the lead 110 will be opposite from the logic voltage signal on the lead 189. That is, when the voltage signal on the lead 110 has a high logic value, the voltage signal on the lead 189 will have a low voltage value, and vice versa. The resistors 196, 195 and the DC voltage level on the lead 197 provided by a power supply (not shown) are used as a voltage divider to supply the positive terminals of the operational amplifiers 188, 194, both of which are connected to the lead 191, with a constant voltage reference signal. The resistors 195, 196 can both have a value of, for example, 10,000 ohms. The DC voltage level provided on the lead 197 can be, for example, five volts. Therefore, the positive terminals of the operational amplifiers 188, 194 connected to the lead 191 will have a constant voltage of approximately 2.5 volts.

The output voltage signal $V_{P1}$ from the operational amplifier 188 on the lead 198 will have a high logic signal if the input signal to the operational amplifier on the lead 110 is greater than 2.5 volts. The output voltage signal $V_{P1}$ from the operational amplifier 188 on the lead 198 will have a low logic signal if the input signal to the operational amplifier 188 on the lead 110 is lower than 2.5 volts. Similarly, the output voltage signal $V_{P2}$ from the operational amplifier 194 on the lead 200 will have a high logic signal if the input signal to the operational amplifier 194 on the lead 189 is greater than 2.5 volts. The output voltage signal $V_{P2}$ from the operational amplifier 194 on the lead 200 will have a low logic signal if the input signal to the operational amplifier 194 on the lead 189 is lower than 2.5 volts.

The resistor 202, the capacitor 204, and the DC voltage level provided by a power supply (not shown) on the lead 205 act to delay and skew the leading edges of the pulses in the voltage signal $V_{P1}$ on the lead 198 to create the voltage signal $V_{S1}$. Likewise, the resistor 206, the capacitor 208, and the DC voltage level provided by a power supply (not shown) on the lead 209 act to delay and skew the leading edges of the pulses in the voltage signal $V_{P2}$ on the lead 200 to create the voltage signal $V_2$. The voltage signals $V_{S1}$ and $V_{S2}$ are shown in FIG. 4. The resistors 202, 206 can both have a value of, for example, 5,600 ohms. The capacitors 204, 208 can both have a value of, for example, 0.01 microfarads. The DC voltage level provided on the leads 205, 209 can both be, for example, five volts.

The resistor 210, the variable resistor 212 and the DC voltage level on the lead 214 provided by a power supply (not shown) are used as a voltage divider to supply the positive terminals of the operational amplifiers 216, 218 with a constant voltage level reference signal. The voltage reference level can be, for example, 2.5 volts, and can be changed by adjusting the variable resistor 212. The resistor 210 can have a value of, for example, 10,000 ohms. The variable resistor 212 can have a range varying between, for example, zero ohms and 20,000 ohms. The DC voltage level provided on the lead 214 can be, for example, five volts.

The operational amplifier 216, the resistors 220, 222, 224, and the DC voltage level on the lead 214 provided by a power supply (not shown) on the lead 226 act as a high gain comparator. If the voltage level of the signal $V_{S1}$ is greater than the voltage level of the reference voltage supplied by the resistors 210, 212, and the DC voltage level on the lead 214, the output signal on the lead 228 will have a high logic voltage value. If the voltage level of the signal $V_{S1}$ is less than the voltage level of the reference voltage supplied by the resistors 210, 212, and the voltage on the lead 214, the output signal on the lead 228 will have a low logic voltage value. A high gain comparator is used so that small differences in the voltage levels being compared can be detected. The operational amplifier 218, the resistors 230, 232, 234, and the DC voltage level on the lead 236 provided by a power supply (not shown) on the lead 226 also function as a high gain comparator in a similar manner to the one described above. The DC voltage levels provided on the leads 226, 236 can both be, for example, five volts. The resistors 220, 224, 230, 234 can all have a value of, for example, 10,000 ohms. The resistors 222, 232 can both have a value of, for example, 1,000,000 ohms.

The output voltage signal from the operational amplifier 216 on the lead 228 is the input signal to the buffer amplifier 240 which lowers the impedance of the voltage signal on the lead 228 and provides an input voltage signal on the lead 242 to the optical isolator 244. The resistor 245 and the DC voltage level on the lead 246 provided by a power supply (not shown) are used as a pull-up resistor circuit. The buffer amplifier 250, the resistor 252, and the DC voltage level on the lead 254 work in a similar fashion and provide an output voltage signal on the lead 256 which is an input signal to the optical isolator 258. The resistors 245, 252 can both have a value of, for example, 10,000 ohms. The DC voltage level provided on the leads 246, 254 can both be, for example, five volts. The use of a buffer amplifier is well known to people having ordinary skill in the art. For example, the DM5417 Hex Buffers with High voltage Open-Collector Outputs manufactured by the National Semiconductor Corporation can be used as the buffer amplifiers 240, 250 in this invention.

The output voltage signal $V_{A1}$ from the optical isolator 244 on the lead 112 is the same as the input voltage signal to the optical isolator 244 on the lead 242. Similarly, the output voltage signal $V_{A2}$ from the optical isolator 258 on the lead 114 is the same as the input voltage signal to the optical isolator 258 on the lead 256. The optical isolator 244 electrically isolates the leads 242, 112 so that there is no direct electrical connection between the leads 242, 112. Similarly, the optical isolator 258 electrically isolates the leads 256, 114 so that there is no direct electrical connection between the leads 256, 114. The optical isolators 244, 258 provide electrical isolation and protection for the circuit from the power generated by the generator 52. Optical isolators and the use of optical isolators are well known to people having ordinary skill in the art. For example, the EXB356 Base Drive Module manufactured by Fuji can be used as the optical isolators 244, 258 in this invention.

Figure 14:
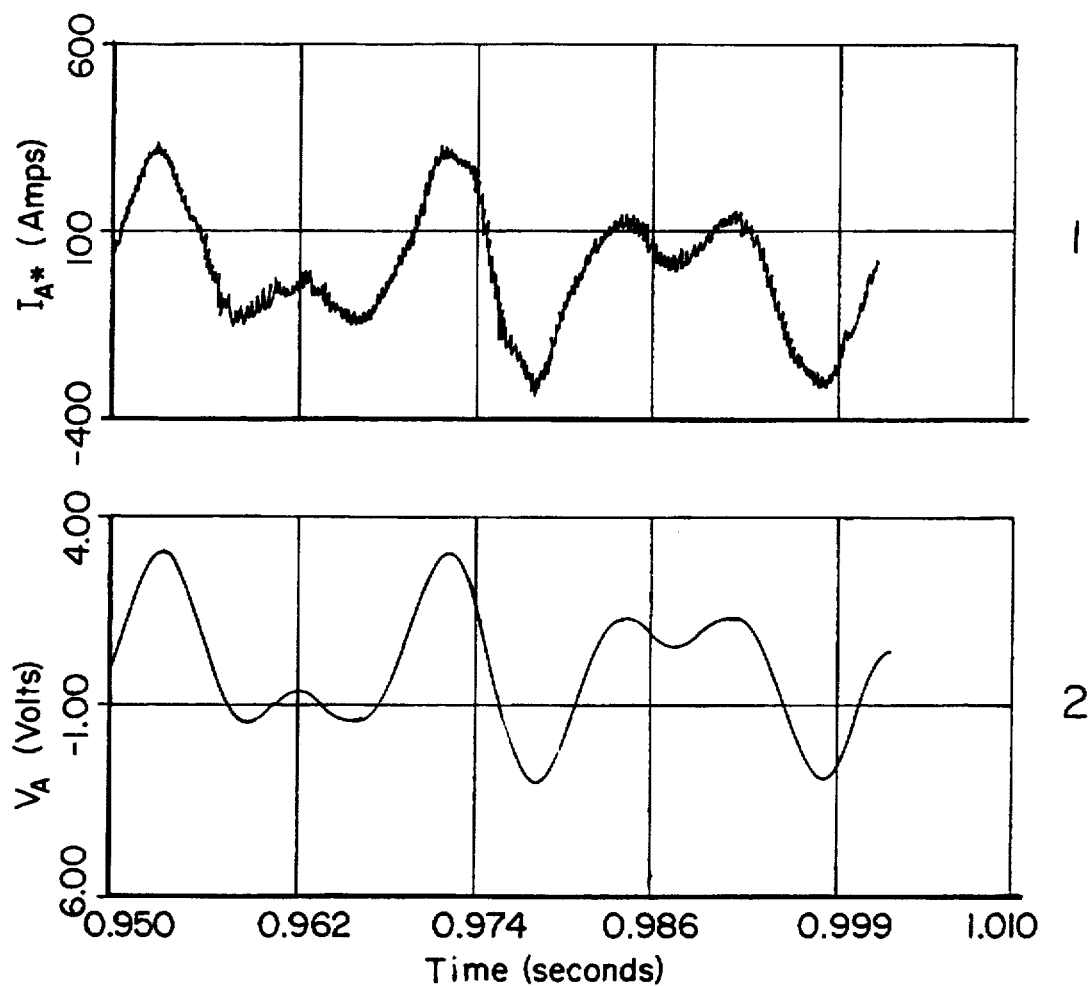
FIG. 14 shows an example voltage signal generated by the command current generator and the corresponding current signal generated by the power converter of the generator system of FIG. 1.

Now referring to FIG. 9, The output voltage signals $V_{A1}$ and $V_{A2}$ from the optical isolators 244, 258 on the leads 112, 114, respectively, are the input signals to the power converter 94. As previously discussed, the purpose of the power converter 94 is to generate the current signals $I_{A*}$, $I_{B*}$, $I_{C*}$ on the leads 60, 62, 64, respectively, that are necessary to excite the stator windings in the generator 52 and to deliver real electric power to the utility 58. The current signals $I_{A*}$, $I_{B*}$, $I_{C*}$ are linearly related to the voltage signals $V_A$, $V_B$, $V_C$ produced by the command current generator 66 on the leads 98, 100, 102, respectively. Referring to FIG. 14, an example waveform for the current signal $I_{A*}$ is shown in graph 1 and example waveform for the voltage signal $V_A$ is shown in graph 2.

Figure 10:
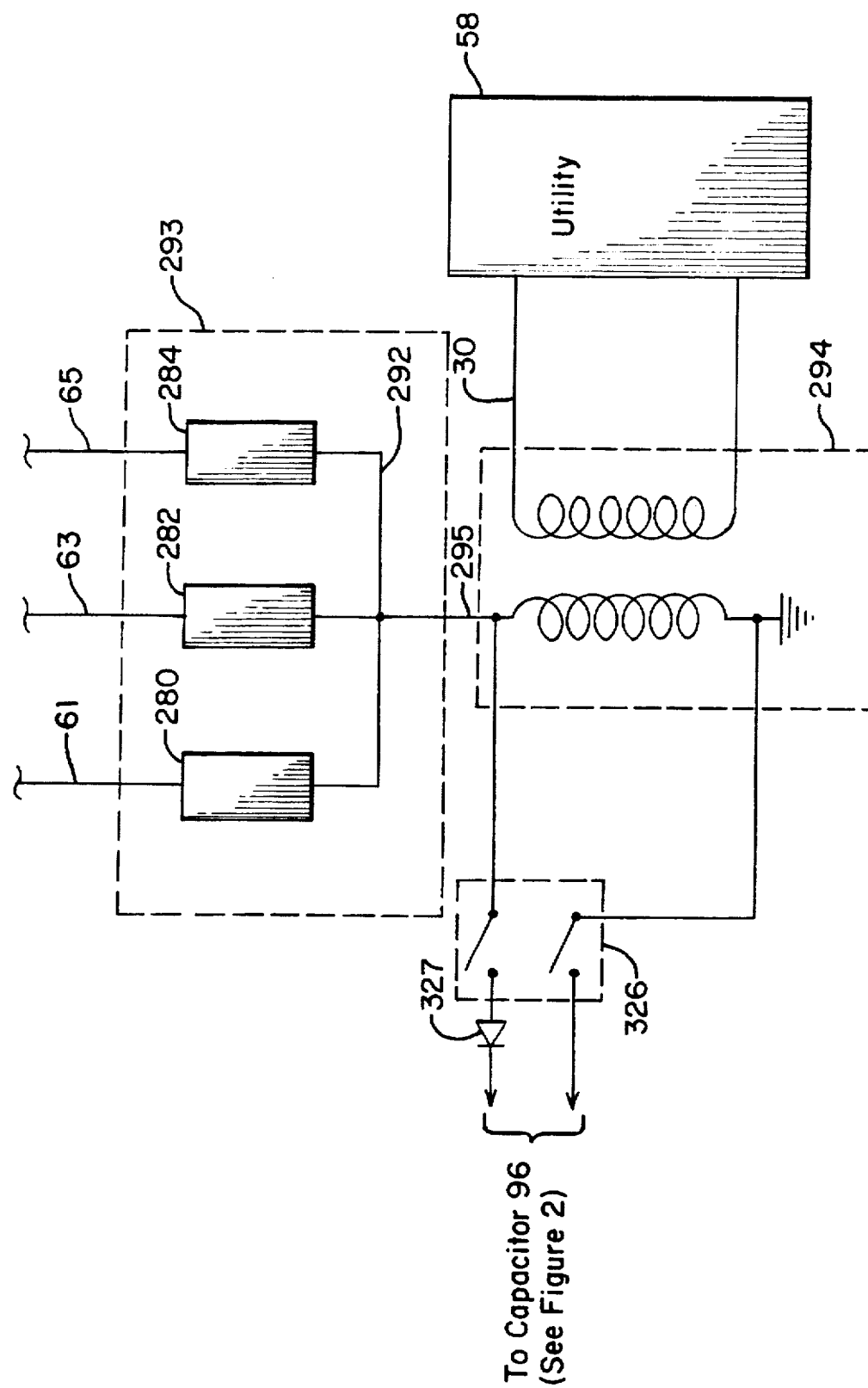
FIG. 10 shows a schematic diagram of the zero sequence filter and transformer portions of the electronic circuitry of the generator system of FIG. 1 constructed to provide single phase electric power to the utility at sixty (60) hertz or other standard frequency and at unity power factor.

As previously discussed and shown in FIGS. 2 and 10, when the generator system 50 becomes operational, the voltage signals in the utility 58 are used to charge the capacitor 96. After the switch 326 is closed, the transformer 294 and the rectifier 327 transform the voltage signals from the utility 58 into a DC voltage signal to charge the capacitor 96. After the capacitor 96 is fully charged to, for example, 800 volts, the switch 326 is opened and the transformer 294 is disconnected from the capacitor 96.

Now referring to FIGS. 8 and 9, after the capacitor 96 is charged and the rotor in the generator begins to rotate, the voltage signals $V_{A1}$ and $V_{A2}$ created by the lock out circuit 86 activate and deactivate the transistors 260, 262, respectively, to create the desired current signal $I_{A*}$ flowing from the power converter 94 on the lead 60. The transistors 260, 262, along with the diodes 264, 266, comprise the power switches 116, 118 previously discussed. When the voltage signal $V_{A1}$ is at its maximum value, the transistor 260 is activated and the transistor 262 is not activated. Likewise, when the voltage signal $V_{A2}$ is at its maximum value, the transistor 260 is not activated and the transistor 262 is activated. Due to the action of the lock out circuit 86, the transistors 260, 262 will never be activated at the same time because the two voltage signals $V_{A1}$, $V_{A2}$ will never be at their maximum values simultaneously.

In general, when the transistor 260 is activated and the transistor 262 is not activated, the current flowing out of the power converter 94 on the lead 60 and through the impedance increases. When the transistor 260 is not activated and the transistor 262 is activated, the current flowing out of the power converter 94 on the lead 60 and through the impedance 272 decreases. As previously discussed, the impedance 272 of the stator winding is primarily inductive but may also include a small resistance.

More specifically, when the current $I_{A*}$ is flowing out of the power converter 94 on the lead 60, the transistor 260 is activated, the transistor 262 is not activated, current flows through the transistor 260, and the current flowing out of the power converter 94 on the lead 60 increases. Current does not flow though the transistor 262 because the transistor 262 is not activated. Furthermore, current does not flow through the diodes 264, 266 because the diodes 264, 266 are reverse biased.

When the current $I_{A*}$ is flowing out of the power converter 94 on the lead 60, the transistor 260 is not activated, the transistor 262 is activated, the diode 264 becomes forward biased, current flows through the diode 266, and the current flowing out of the power converter 94 on the lead 60 decreases. Current does not flow through the transistor 260 because the transistor 260 is not activated. Current does not flow through the diode 264 because the diode 264 is reverse biased.

When the current $I_{A*}$ is flowing into the power converter 94 on the lead 60, the transistor 260 is activated, the transistor 262 is not activated, the diode 266 becomes forward biased, current flows through the diode 264, and the current flowing into the power converter 94 on the lead 60 decreases. Current does not flow though the transistor 262 because the transistor 262 is not activated. Current does not flow through the diode 266 because the diode 266 is reverse biased.

When the current $I_{A*}$ is flowing into the power converter 94 on the lead 60, the transistor 260 is not activated, the transistor 262 is activated, current flows through the transistor 262, and the current flowing into the power converter 94 on the lead 60 increases. Current does not flow through the transistor 260 because the transistor 260 is not activated. Current does not flow through the diodes 264, 266 because the diodes 264, 266 are reverse biased.

By the selective activation and deactivation of the transistors 260, 262, 296, 298, 300, and 302, the current signals $I_{A*}$, $I_{B*}$, $I_{C*}$ are created on the leads 60, 62, 64, respectively. So long as the voltage in the capacitor 96 is higher than the voltages in the utility 58 and in the generator 52, current can be pushed out of the capacitor 96 in the desired phase and with the desired waveform. The real power generated by the generator 52 will be transferred to the capacitor 96 which will in turn transfer the real power to the utility 58 via the zero sequence currents $I_{AO*}$, $I_{BO*}$, $I_{CO*}$. Therefore, the real power generated by the generator 52 will be passed to the utility 58. While at any instantaneous point in time, current may be flowing into or out of the capacitor 96, the average current flowing into or out of the capacitor 96 will be zero if all of the generated power is delivered to the utility 58. Therefore the average voltage level across the capacitor 96 will remain constant if all of the generated power is delivered to the utility 58.

It is desirable to have the magnitude $I_{F*}$ of the zero sequence current signals $I_{AO*}$, $I_{BO*}$, $I_{CO*}$ be correctly adjusted so that all of the real power generated by the generator 52 is delivered to the utility 58. This can be done by sensing the voltage across the capacitor 96 with the voltage sensor 322 which provides a voltage input signal that is directly proportional to the voltage across the capacitor 96 to the command current generator 66 on the lead 324. Due to the law of the conservation of energy, if all of the real power generated by the generator 52 is not delivered to the utility 58, the power must be transferred to the power converter 94, which will increase of the voltage across the capacitor 96. If the voltage across the capacitor 96 increases, the command current generator 66 will increase the magnitude $V_F$ of the zero sequence voltage signals $V_{AO}$, $V_{BO}$, $V_{CO}$ which will increase the magnitude $I_{F*}$ of the zero sequence current signals $I_{AO*}$, $I_{BO*}$, $I_{CO*}$ produced by the power converter 94 so that the real power stored in the capacitor 96 will be delivered to the utility 58. Once the real power stored in the capacitor 96 is delivered to the utility 58, the voltage level across the capacitor 96 will decrease, the command current generator 66 will decrease the magnitude $V_F$ of the zero sequence voltage signals $V_{AO}$, $V_{BO}$, $V_{CO}$ which will then decrease the magnitude $I_{F*}$ of the zero sequence current signals $I_{AO*}$, $I_{BO*}$, $I_{CO*}$ produced by the power converter 94.

Now referring to FIGS. 2 and 10, the output circuit 56 includes a zero sequence filter 293 and a transformer 294. The zero sequence filter 293 comprises three identical inductors 280, 282, 284 connected to the generator system by the power taps and leads 61, 63, 65, respectively. The inductors 280, 282, 284 are connected in a common node connection with the output lead 295 from the common node connected to the transformer 294. Since the impedances 272, 274, 276 (see FIG. 9) of the stator windings in the generator 52 are connected in a star configuration with no output lead, the zero sequence current signals $I_{AO*}$, $I_{BO*}$, $I_{CO*}$ will flow only through the zero sequence filter 293 to the transformer 294. As previously discussed, the positive sequence current signals $I_{A+*}$, $I_{B+*}$, $I_{C+*}$ have a much higher frequency $f_+$ than the frequency $f_0$ of zero sequence current signals $I_{AO*}$, $I_{BO*}$, $I_{CO*}$. The frequency $f_0$ is sixty (60) hertz and the frequency $f_+$ can be, for example, between sixty (60) and 120 hertz. The inductors 280, 282, 284 in the zero sequence filter 293 choke the higher frequency positive sequence current signals $I_{A+*}$, $I_{B+*}$, $I_{C+*}$ from passing through the zero sequence filter 293 to the transformer 294, thereby acting as a bandpass or frequency filter for the zero sequence current signals $I_{AO*}$, $I_{BO*}$, $I_{CO*}$ and as a high impedance block for the positive sequence current signals $I_{A+*}$, $I_{B+*}$, $I_{CO+*}$ so that the positive sequence current signals $I_{A+*}$, $I_{B+*}$, $I_{C+*}$ flow into the stator windings 272, 274, 276.

If the frequency $f_+$ of the positive sequence current signals $I_{A+*}$, $I_{B+*}$, $I_{C+*}$ is expected to be less than the frequency $f_0$ of the zero sequence current signals $I_{AO*}$, $I_{BO*}$, $I_{CO*}$, capacitors can be used instead of the inductors 280, 282, 284 to choke the lower frequency positive sequence current signals $I_{A+*}$, $I_{B+*}$, $I_{C+*}$ from passing through the zero sequence filter 293 to the transformer 294. The common node configuration of the inductors 280, 282, 284 also prevents the positive sequence current signals $I_{A+*}$, $I_{B+*}$, $I_{C+*}$ from being transmitted to the transformer 294.

The output from the zero sequence filter on the lead 295 is the input to the transformer 294. The transformer 294 electrically isolates the generator system 50 from the utility 58 and provides the means for delivering the power generated by the generator system 50 to the utility 58. As previously discussed, the power transferred to the utility 58 is single phase, sinusoidal with a frequency of sixty (60) hertz, and has a unity power factor. In addition, the power delivered to the utility 58 is synchronized to and in phase with the signals in the utility 58. The use of a transformer to supply power to a utility is well known to people having ordinary skill in the art. For example, the 6H10000H Universal Isolation Transformer manufactured by Abbott Technologies, Inc., of Sun Valley, Calif. can be used as the transformer 294 in this invention.

It is apparent that numerous modifications and changes can be made to the invention described above. For example, either an induction generator or a synchronous generator can be used. Furthermore, a wound rotor or a squirrel cage rotor can be used to create and deliver the energy that charges the capacitor 96 without significantly changing the structure of the generator system 50 to allow the generate system 50 generate both positive sequence currents and zero sequence currents on the leads 60, 62, 64 to excite the stator windings 272, 276, 278 and to deliver the generated power to the utility 58 via the zero sequence filter 293. More specifically, using a wound rotor requires that the wound rotor coils be connected to the capacitor 96 in such a way that the generated power charges the capacitor 96. Regardless of the type of rotor used, the generator system disclosed above is usable with many different power sources for driving the rotor, including wind power, water or hydro power, geothermal power, etc.

It should also be apparent that instead of using a set of zero sequence currents to transfer the generated power to the utility 58, only a single sixty (60) hertz signal generated by the excitation controller 54 on only one of the leads 60, 62, 64 is necessary to transfer the generated power to the utility 58. The excitation controller 54 can adjust the frequency and phase of the single sixty (60) hertz signal to match the frequency and phase of the utility 58 and can increase or decrease the amplitude of the single sixty (60) hertz signal to correspondingly increase or decrease the amount of generated power that is delivered to the utility 58.

The foregoing description is considered as illustrative only of the principles of the invention. Furthermore, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

The embodiments of the invention in which an exclusive property or privilege is claimed are defined as follows:

1. Generator apparatus, comprising:
   a variable speed rotor that is magnetically coupled to a plurality of electrically excited stator windings that are connected together at a common node;
   filter means connected electrically to at least one of said stator windings for passing current that has a first characteristic and for blocking current that has a second characteristic;
   a chargeable energy storage device connectable electrically, but not through said filter, to said stator windings;
   switch means positioned between said energy storage device and said stator windings for connecting and disconnecting said energy storage device to and from said stator windings; and
   load connection means for making an electrical connection of a load through said filter means to at least one of said stator windings, said electrical connection of the load to at least one of said stator windings being positioned between said stator winding and said switch means.

2. The apparatus of claim 1, wherein said filter is a zero sequence filter.

3. The apparatus of claim 2, including a transformer connected between said zero sequence filter and said load.

4. The apparatus of claim 2, wherein said zero sequence filter includes a plurality of inductive elements.

5. The apparatus of claim 4, wherein each of said plurality of inductive elements is connected to one of said stator windings and each of said stator windings is connected to at least one of said plurality of inductive elements.

6. The apparatus of claim 5, wherein said stator windings consists of three stator windings.

7. The apparatus of claim 6, wherein said plurality of inductive elements consists of three inductive elements.

8. The apparatus of claim 2, wherein said zero sequence filter includes a plurality of capacitive elements.

9. The apparatus of claim 8, wherein each of said plurality of capacitive elements is connected to one of stator windings and each of said stator windings is connected to at least one of said plurality of capacitive elements.

10. The apparatus of claim 9, wherein said stator windings consists of three stator windings.

11. The apparatus of claim 10, wherein said plurality of capacitive elements consists of three capacitive elements.

12. The apparatus of claim 1, wherein said energy storage device includes a capacitor.

13. The apparatus of claim 1, including an electric energy source connectable to said energy storage device, said electric energy source being capable of charging said energy storage device when said electric energy source is connected to said energy storage device.

14. The apparatus of claim 1, including actuator control means for actuating said switch means to connect and disconnect said energy storage device and said stator windings in a manner that creates electric excitation signals having a first characteristic that is not passable through said filter and electric power signals having a second characteristic that is passable through said filter.

15. The apparatus of claim 14, wherein said actuator control means includes energy sensing means connected to said energy storage device for sensing energy level stored in said energy storage device and actuating said switch means to produce said electric power signals when the energy level of said energy storage device is above a target energy level.

16. The apparatus of claim 14, wherein said actuator control means includes angular velocity sensing means for measuring angular velocity of said rotor and actuating said switch means that produces electric excitation signals having a frequency that maximizes the production of electric energy.

17. A method of producing and delivering electrical energy to a load, comprising the steps of:
   generating electrical energy with a variable angular velocity rotating rotor that is magnetically coupled to a plurality of stator windings;
   storing said electrical energy;
   tapping the electrical energy stored to create electric excitation signals having a first characteristic on a plurality of conductors that are connected respectively to said stator windings;

tapping the electrical energy stored to create electric power signals having a second characteristic distinct from said first characteristic on at least one of said conductors; and connecting the load electrically to the conductor or conductors that has or have said electric power signals via a filter that passes said electric power signals and blocks said electric excitation signals.

18. The method of claim 17, including the step of creating said electric excitation signals to have the first characteristic of being in positive sequence.

19. The method of claim 18, including the step of creating said electrical excitation signals with a frequency that is adjustable within an excitation frequency range.

20. The method of claim 19, including the step of adjusting the frequency of the excitation signals within the excitation range to maximize the electrical energy generated for an angular velocity at which the rotor is rotating.

21. The method of claim 20, including the steps of measuring angular velocity of the rotating rotor, determining an optimum frequency for the excitation signals that will cause the rotating rotor interacting with the stator windings to generate maximum electrical energy at the angular velocity measured, and adjusting the frequency of the excitation signals to that optimum frequency.

22. The method of claim 21, including the steps of determining empirically a gamut of optimum frequencies in said excitation frequency range that will cause the rotating rotor interacting with the stator windings to generate maximum electrical energy at a variety of angular velocities, and selecting the optimum frequency from the gamut that corresponds to the angular velocity measured.

23. The method of claim 17, including the steps of establishing a target level for the stored energy that is sufficient to provide the electric excitation signals necessary to interact with the rotating rotor to generate the electrical energy and maintaining the electrical energy stored at the target level.

24. The method of claim 23, including the steps of measuring the electrical energy stored and adjusting the electric power signals to deliver excess electrical energy over the target level to the load.

25. The method of claim 24, including the steps of creating said electric excitation signals to have the first characteristics of being in positive sequence and with a frequency that is adjustable within an excitation frequency range, and creating said electric power signals to have the second characteristic include a frequency that is not in said excitation frequency range.

26. The method of claim 25, including the step of creating said electric power signals on more than one of said conductors to have the second characteristic also include said electric power signals being in phase with each other.

27. The method of claim 26, including the step of creating said electric power signals to have the second characteristic also include said electric power signals having the same magnitude on each of the conductors that has electric power signals.

28. The method of claim 27, including the steps of connecting said stator windings in a star configuration and providing said filter to have a higher impedance in said excitation frequency range than at the frequency of the electric power signal.

29. The method of claim 27, including the step of providing said filter to have a higher impedance in said excitation frequency range than impedances in the stator windings.

30. The method of claim 28, including the steps of connecting the load to the conductors that have electric power signals at a node that is common to the conductors and positioning an impedance producing device between each of the conductors and the node.

31. The method of claim 30, including the step of using an inductor for the impedance producing device between each of the conductors and the node.

32. The method of claim 30, including the step of using a capacitor for the impedance producing device between each of the conductors and the node.

* * * * *